United States Patent
Weslosky et al.

(10) Patent No.: US 11,698,634 B2
(45) Date of Patent: Jul. 11, 2023

(54) REMOTE ASSISTANCE SYSTEM FOR AUTONOMOUS VEHICLE

(71) Applicant: Nuro, Inc., Mountain View, CA (US)

(72) Inventors: Emily Anna Weslosky, San Francisco, CA (US); William Paul Maddern, Sunnyvale, CA (US); Aleena Pan Byrne, San Mateo, CA (US); Pratik Agarwal, Sunnyvale, CA (US)

(73) Assignee: NURO, INC., Mountain View, CA (US)

( * ) Notice: Subject to any disclaimer, the term of this patent is extended or adjusted under 35 U.S.C. 154(b) by 338 days.

(21) Appl. No.: 17/095,012

(22) Filed: Nov. 11, 2020

(65) Prior Publication Data

US 2021/0149389 A1 May 20, 2021

Related U.S. Application Data

(60) Provisional application No. 62/936,820, filed on Nov. 18, 2019.

(51) Int. Cl.
*G05D 1/00* (2006.01)

(52) U.S. Cl.
CPC ......... *G05D 1/0016* (2013.01); *G05D 1/0038* (2013.01); *G05D 1/0077* (2013.01); *G05D 2201/0213* (2013.01)

(58) Field of Classification Search
CPC .. G05D 1/0016; G05D 1/0038; G05D 1/0077; G05D 2201/0213
USPC ............................................................ 701/2
See application file for complete search history.

(56) References Cited

U.S. PATENT DOCUMENTS

| | | | |
|---|---|---|---|
| 9,008,890 B1 * | 4/2015 | Herbach | G07C 5/008 340/436 |
| 9,465,388 B1 | 10/2016 | Fairfield et al. | |
| 9,494,935 B2 | 11/2016 | Okumura et al. | |
| 9,616,896 B1 * | 4/2017 | Letwin | B60K 35/00 |
| 9,720,410 B2 * | 8/2017 | Fairfield | G05D 1/0027 |
| 10,514,692 B2 | 12/2019 | Liu et al. | |

(Continued)

OTHER PUBLICATIONS

Cameron, Oliver, "Introducing Voyage Telessist", https://news.voyage.auto/introducing-voyage-telessist-a085e4c1f691, Jul. 8, 2020, 15 pages.

*Primary Examiner* — Hunter B Lonsberry
*Assistant Examiner* — Robert Louis Pinkerton
(74) *Attorney, Agent, or Firm* — Edell, Shapiro & Finnan, LLC

(57) ABSTRACT

A system for providing remote assistance to an autonomous vehicle is disclosed herein. The system includes at least one remote assistance button configured to be selectively activated to initiate remote assistance for the autonomous vehicle. Each remote assistance button corresponds to a dedicated remote assistance function for the autonomous vehicle. For example, the system can include remote assistance buttons for causing the autonomous vehicle to stop, decelerate, or pull over. The system includes a controller configured to detect activation of the remote assistance button(s) and to cause remote assistance to be provided to the autonomous vehicle in response to the activation. For example, the autonomous vehicle may perform an action corresponding to the activated button with input assistance from the controller but without the system taking over control of the autonomous vehicle.

28 Claims, 18 Drawing Sheets

(56) References Cited

U.S. PATENT DOCUMENTS

| | | | |
|---|---|---|---|
| 2017/0308082 A1* | 10/2017 | Ullrich | B60W 60/0059 |
| 2017/0323639 A1* | 11/2017 | Tzirkel-Hancock | H04R 5/023 |
| 2018/0224844 A1* | 8/2018 | Zhang | H04L 67/1097 |
| 2019/0019349 A1* | 1/2019 | Dolgov | B60W 60/0025 |
| 2019/0354111 A1* | 11/2019 | Cheng | G05D 1/0027 |
| 2020/0004269 A1* | 1/2020 | Oba | G05D 1/0088 |
| 2020/0201319 A1* | 6/2020 | Gross | H04W 4/44 |
| 2020/0209845 A1* | 7/2020 | Chen | G05D 1/0038 |

\* cited by examiner

REMOTE ASSISTANCE SYSTEM FOR AUTONOMOUS VEHICLE

CROSS REFERENCE TO RELATED APPLICATION

This application claims priority to U.S. Provisional Patent Application No. 62/936,820, titled "Methods and Apparatus for Handling Out-of-Scope Issues When a Vehicle is Driving Autonomously," filed Nov. 18, 2019, the entirety of which is incorporated herein by reference.

TECHNICAL FIELD

The disclosure relates generally to providing remote assistance to autonomous vehicles.

BACKGROUND

The handling and delivery of goods and services using autonomous vehicles will improve society, e.g., by allowing people to engage in productive work while waiting for an autonomous vehicle to deliver goods rather than spending time procuring the goods. As the use of autonomous vehicles is growing, the ability to operate the autonomous vehicles efficiently and safely is becoming more important.

DESCRIPTION OF EXAMPLE EMBODIMENTS

Overview

Figure 1:
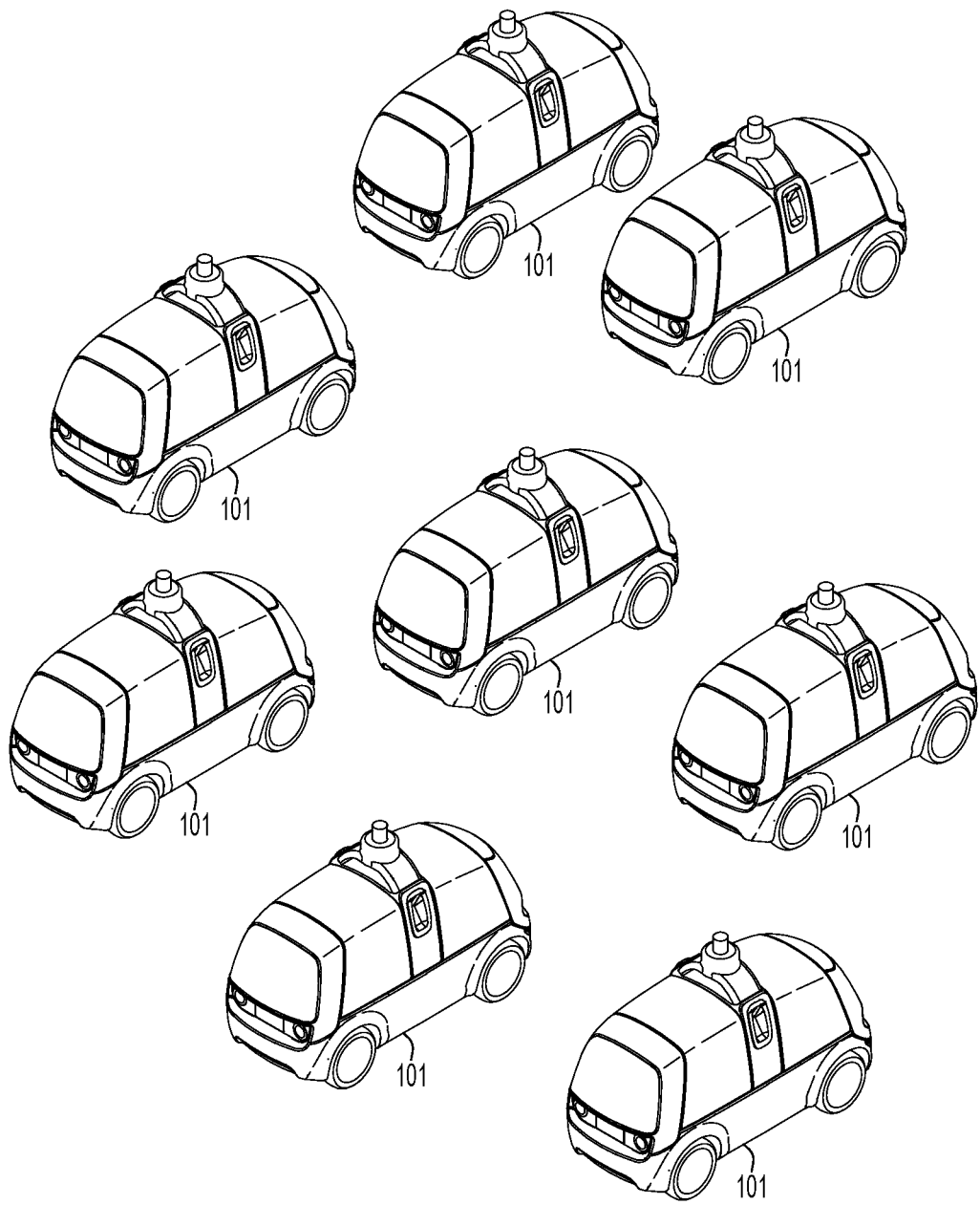
FIG. 1 is a diagram of an autonomous vehicle fleet, according to an example embodiment.

In one embodiment, a system for providing remote assistance to an autonomous vehicle includes at least one remote assistance button configured to be selectively activated to initiate remote assistance for the autonomous vehicle. Each remote assistance button corresponds to a dedicated remote assistance function for the autonomous vehicle. For example, the system can include remote assistance buttons for causing the autonomous vehicle to stop, decelerate, or pull over.

The system includes a controller configured to detect activation of the remote assistance button(s) and to cause remote assistance to be provided to the autonomous vehicle in response to the activation. For example, the autonomous vehicle may perform an action corresponding to the activated button with input assistance from the controller but without the system taking over control of the autonomous vehicle.

Example Embodiments

As the use of autonomous vehicles becomes more widespread, the ability to address unforeseen or unplanned issues is increasing in importance. For example, an autonomous vehicle may encounter situations outside of the operational domain of the autonomous vehicle, like unmapped construction zones; objects, potholes, stalled or disabled vehicles, or other hazards in a path of the autonomous vehicle; crossing guards; police directing traffic; emergency vehicles; honking vehicles; tailgating vehicles, etc. In addition, mechanical or other issues affecting an autonomous vehicle may cause the autonomous vehicle to unexpectedly engage in unsafe or otherwise inappropriate behavior, like juking, swerving, hard braking, striking or drifting towards curbs, not yielding, tailgating, etc. The ability to provide remote assistance to autonomous vehicles may enable the autonomous vehicles to effectively and efficiently address these issues, thereby allowing the autonomous vehicles to continue operating safely and effectively, with substantially minimized downtime.

In an example embodiment, a fleet of autonomous vehicles may be part of an interconnected or remote command ecosystem that allows the fleet to be remotely commanded, e.g., when there is an unexpected situation. For example, the ecosystem may include a fleet management system that is located remotely from the autonomous vehicles and includes a remote operations subsystem that is configured to provide remote assistance to the autonomous vehicles. The remote operations subsystem may include, for example, functionality for seizing control of the autonomous vehicle, e.g., through a teleoperations or remote control mechanism, and/or functionality for providing assistance (e.g., supervision and/or input) to the autonomous vehicle without taking control of the autonomous vehicle.

For example, the remote operations subsystem may include at least one remote assistance button configured to be selectively activated, e.g., by a human operator, to initiate remote assistance for an autonomous vehicle. Each remote assistance button can correspond to a dedicated remote assistance function for the autonomous vehicle. For example, the remote operations subsystem can include remote assistance buttons for causing the autonomous vehicle to stop, decelerate, or pull over. The remote operations subsystem also can include a controller configured to detect activation of the remote assistance button(s) and to cause remote assistance to be provided to the autonomous vehicle in response to the activation of the remote assistance button(s). For example, the autonomous vehicle may perform an action corresponding to the activated button with input assistance from the controller but without the system taking over control of the autonomous vehicle.

Example embodiments that may be used to implement the features and functionality of this disclosure will now be described with more particular reference to the accompanying figures. When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate", etc.) should be understood as indicating values very near to those which accompany the aforementioned term. That is to say, a deviation within reasonable limits from an exact value should be accepted because a skilled person in the art will understand that such a deviation from the values indicated is inevitable due to measurement inaccuracies, etc. The same applies to the terms "about" and "around" and "substantially". Similarly, when used herein, the term "comprises" and its derivations (such as "comprising", etc.) should not be understood in an excluding sense, that is, these terms should not be interpreted as excluding the possibility that what is described and defined may include further elements, steps, etc. Further, each example embodiment is described herein as illustrative and is not to be construed as a preferred or advantageous embodiment, but rather as one example or illustration of a possible embodiment.

Referring initially to FIG. 1, an autonomous vehicle fleet 100 will be described in accordance with an example embodiment. The autonomous vehicle fleet 100 includes a plurality of autonomous vehicles 101. Each autonomous vehicle 101 is a manned or unmanned mobile machine configured to transport people, cargo, or other items, whether on land or water, air, or another surface, such as a car, wagon, van, tricycle, truck, bus, trailer, train, tram, ship, boat, ferry, drove, hovercraft, aircraft, spaceship, etc.

Each autonomous vehicle 101 may be fully or partially autonomous such that the vehicle can travel in a controlled manner for a period of time without human intervention. For example, a vehicle may be "fully autonomous" if it is configured to be driven without any assistance from a human operator, whether within the vehicle or remote from the vehicle, while a vehicle may be "semi-autonomous" if it uses some level of human interaction in controlling the operation of the vehicle, whether through remote control by, or remote assistance from, a human operator, or local control/assistance within the vehicle by a human operator. A vehicle may be "non-autonomous" if it is driven by a human operator located within the vehicle. A "fully autonomous vehicle" may have no human occupant or it may have one or more human occupants that are not involved with the operation of the vehicle; they may simply be passengers in the vehicle.

In an example embodiment, each autonomous vehicle 101 may be configured to switch from a fully autonomous mode to a semi-autonomous mode, and vice versa. Each autonomous vehicle 101 also may be configured to switch between a non-autonomous mode and one or both of the fully autonomous mode and the semi-autonomous mode.

The fleet 100 may be generally arranged to achieve a common or collective objective. For example, the autonomous vehicles 101 may be generally arranged to transport and/or deliver people, cargo, and/or other items. A fleet management system (not shown) can, among other things, coordinate dispatching of the autonomous vehicles 101 for purposes of transporting, delivering, and/or retrieving goods and/or services. The fleet 100 can operate in an unstructured open environment or a closed environment.

Figure 2:
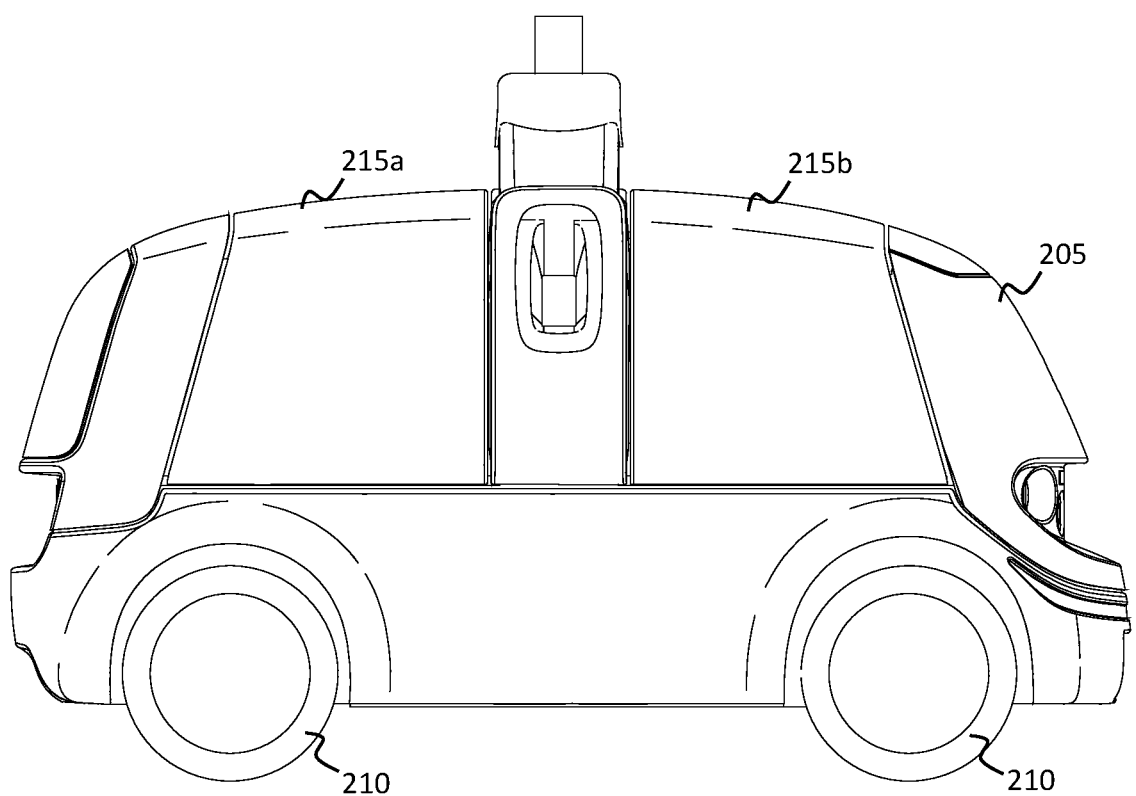
FIG. 2 is a diagram of a side of an autonomous vehicle, according to an example embodiment.

FIG. 2 is a diagram of a side of an autonomous vehicle 101, according to an example embodiment. The autonomous vehicle 101 includes a body 205 configured to be conveyed by wheels 210 and/or one or more other conveyance mechanisms. In an example embodiment, the autonomous vehicle 101 is relatively narrow (e.g., approximately two to approximately five feet wide), with a relatively low mass and low center of gravity for stability.

The autonomous vehicle 101 may be arranged to have a moderate working speed or velocity range of between approximately one and approximately forty-five miles per hour ("mph"), e.g., approximately twenty-five mph, to accommodate inner-city and residential driving speeds. In addition, the autonomous vehicle 101 may have a substantially maximum speed or velocity in a range of between approximately thirty and approximately ninety mph, which may accommodate, e.g., high speed, intrastate or interstate driving. As would be recognized by a person of ordinary skill in the art, the vehicle size, configuration, and speed/velocity ranges presented herein are illustrative and should not be construed as being limiting in any way.

The autonomous vehicle 101 includes multiple compartments (e.g., compartments 215a and 215b), which may be assignable to one or more entities, such as one or more customers, retailers, and/or vendors. The compartments are generally arranged to contain cargo and/or other items. In an example embodiment, one or more of the compartments may be secure compartments. The compartments 215a and 215b may have different capabilities, such as refrigeration, insulation, etc., as appropriate. It should be appreciated that the number, size, and configuration of the compartments may vary. For example, while two compartments (215a, 215b) are shown, the autonomous vehicle 101 may include more than two or less than two (e.g., zero or one) compartments.

Figure 3:
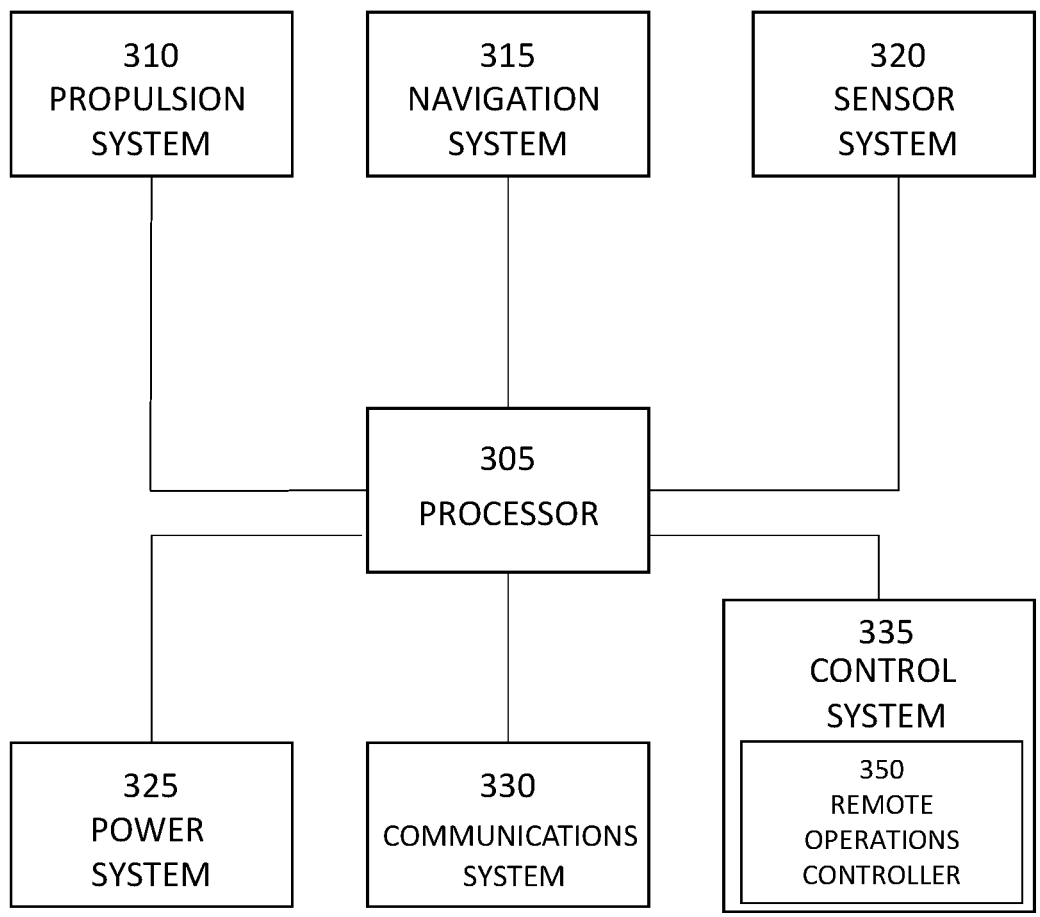
FIG. 3 is a block diagram representation of functional components of an autonomous vehicle, according to an example embodiment.

FIG. 3 is a block diagram representation of certain functional components of the autonomous vehicle 101, according to an example embodiment. With reference to FIGS. 2 and 3, the autonomous vehicle 101 includes a processor 305, which is operatively coupled to, and configured to send instructions to, and receive instructions from or for, various systems of the autonomous vehicle 101, including: a propulsion system 310, a navigation system 315, a sensor system 320, a power system 325, a communications system 330, and a control system 335. The processor 305 and systems are operatively coupled to, or integrated with, the body 205 (FIG. 2) of the autonomous vehicle 101 and generally cooperate to operate the autonomous vehicle 101.

The propulsion system 310 includes components configured to drive (e.g., move or otherwise convey) the autonomous vehicle 101. For example, the propulsion system 310 can include an engine, wheels, steering, and a braking system, which cooperate to drive the autonomous vehicle 101. In an example embodiment, the engine may be a gas engine, a turbine engine, an electric motor, and/or a hybrid gas/electric engine. As would be appreciated by a person of ordinary skill in the art, the propulsion system 310 may include additional or different components suitable or desirable for conveying an object, which are now known or hereinafter developed, such as one or more axles, treads, wings, rotors, blowers, rockets, propellers, and/or other components.

Although the autonomous vehicle 101 shown in FIGS. 1 and 2 has a 4-wheeled, 2-axle automotive configuration, this configuration is illustrative and should not be construed as being limiting in any way. For example, the autonomous vehicle 101 may have more or less than 4 wheels, more or less than 2 axles, and a non-automotive configuration in an alternative example embodiment. For example, the vehicle may be configured for travel other than land travel, such as water travel, hover travel, and/or air travel without departing from the spirit or the scope of the present disclosure.

The navigation system 315 can be configured to control the propulsion system 310 and/or provide guidance to an operator associated with the autonomous vehicle 101 to navigate the autonomous vehicle 101 through paths and/or within unstructured open or closed environments. The navigation system 315 may include, e.g., digital maps, street view photographs, and/or a global positioning system ("GPS") point. For example, the navigation system 315 may cause the autonomous vehicle 101 to navigate through an environment based on information in the digital maps and information from sensors included in the sensor system 320.

The sensor system 320 includes one or more sensors configured to view and/or monitor conditions on or around the autonomous vehicle 101. For example, the sensors can ascertain when there are objects near the autonomous vehicle 101 to enable the autonomous vehicle 101 to safely guide the autonomous vehicle 101 (via the navigation system 315) around the objects. The sensors may include, e.g., cameras (e.g., running at a high frame rate, akin to video), light detection and ranging ("LiDAR"), radar, ultrasonic sensors, microphones, altimeters, etc. In an example embodiment, the sensor system 320 includes propulsion system sensors that monitor drive mechanism performance, drive train performance, and/or power system levels. The sensor system 320 also may include one or more microphones configured to detect sounds external to the autonomous vehicle 101, such as a siren from an emergency vehicle requesting a right-of-way, a honk from another vehicle, etc.

The power system 325 is arranged to provide power to the autonomous vehicle 101. Power may be provided as electrical power, gas power, or any other suitable power, e.g., solar power or battery power. In an example embodiment, the power system 325 may include a main power source and an auxiliary power source configured to power various components of the autonomous vehicle 101 and/or to generally provide power to the autonomous vehicle 101 when the main power source does not have the capacity to provide sufficient power.

The communications system 330 is arranged to enable communication between the autonomous vehicle 101 and an external person or device. For example, the communications system 330 can be configured to enable communication via wireless local area network (WLAN) connectivity (e.g., cellular) or any other wireless or mobile communication capability now known or hereinafter developed. In an example embodiment, the communications system 330 can communicate wirelessly with a fleet management system (not shown in FIG. 3), which is arranged to control and/or assist the autonomous vehicle 101 from a location remote from the autonomous vehicle 101. For example, the communications system 330 can generally obtain or receive data, store the data, and transmit or provide the data to the fleet management system and/or to one or more other vehicles within a fleet. The data may include, but is not limited to including, information relating to scheduled requests or orders, information relating to on-demand requests or orders, information relating to a need for the autonomous vehicle 101 to reposition itself, e.g., in response to an anticipated demand, information regarding an operational or mechanical need or behavior of the autonomous vehicle 101, information regarding an upcoming construction zone or other hazard in the path of the autonomous vehicle 101, etc.

In an example embodiment, the control system 335 may cooperate with the processor 305 and each of the other systems in the autonomous vehicle 101, including the propulsion system 310, the navigation system 315, the sensor system 320, the power system 325, and the communications system 330, to control operation of the autonomous vehicle 101. For example, the control system 335 may cooperate with the processor 305 and the other systems to determine where the autonomous vehicle 101 may safely travel and to detect (e.g., based on data from the sensor system 320 and/or from an external system (not shown) communicating with the autonomous vehicle 101 via the communications system 330), and navigate around, objects in a vicinity around the autonomous vehicle 101. In other words, the control system 335 may cooperate with the processor 305 and other systems to effectively determine and facilitate what the autonomous vehicle 101 may do within its immediate surroundings. For example, the control system 335 in cooperation with the processor 305 may essentially control the power system 325 and/or the navigation system 315 as part of driving or conveying the autonomous vehicle 101. In this sense, the control system 335 manages autonomous control of the autonomous vehicle 101. Additionally, the control system 335 may cooperate with the processor 305 and communications system 330 to provide data to, or obtain data from, other vehicles, a fleet management server, a GPS, a personal computer, a teleoperations system, a smartphone, or any other computing device via the communications system 330.

In an example embodiment, the control system 335 includes a remote operations controller 350, which is configured to cooperate with a fleet management system (and one or more of the systems of the autonomous vehicle 101) to enable the fleet management system to provide remote assistance to the autonomous vehicle 101. For example, the fleet management system can include a remote operations subsystem with functionality for cooperating with the remote operations controller 350 to effectively seize control of the autonomous vehicle 101, e.g., through a teleoperations or remote control mechanism. In addition, or in the alternative, the remote operations subsystem can include functionality for cooperating with the remote operations controller 350 to provide assistance (e.g., supervision and/or input) to the autonomous vehicle 101 without taking control of the autonomous vehicle 101. An example fleet management system is described below, with reference to FIG. 4.

Figure 4:
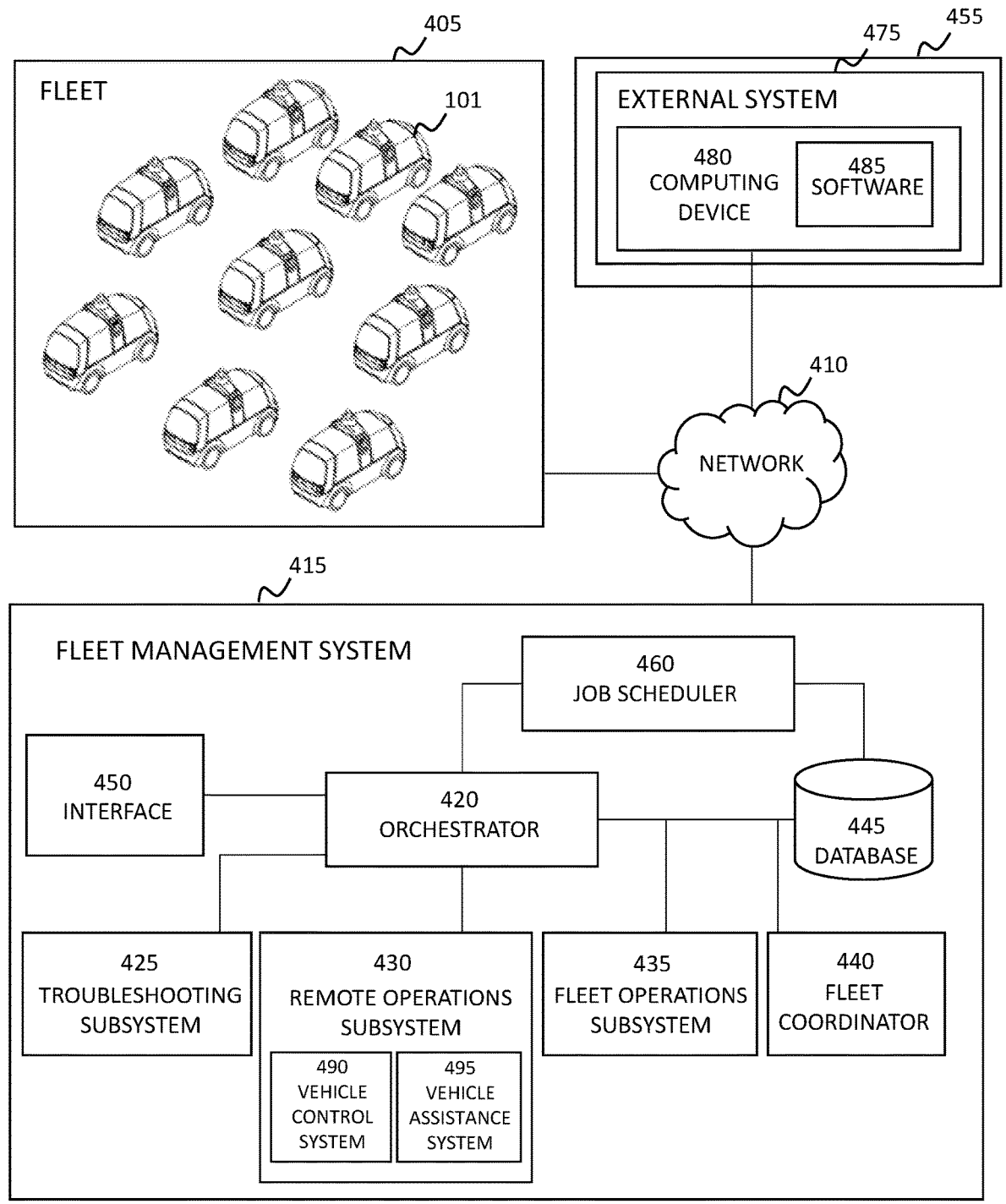
FIG. 4 is a block diagram representation of functional components of an interconnected autonomous vehicle fleet ecosystem, according to an example embodiment.

FIG. 4 is a block diagram representation of functional components of an interconnected autonomous vehicle fleet ecosystem 400, according to an example embodiment. The ecosystem 400 includes an autonomous vehicle fleet 405 including a plurality of autonomous vehicles 101. The autonomous vehicles 101 in the autonomous vehicle fleet 405 are interconnected with one another, a fleet management system 415, and at least one system external to the fleet management system (an "external system") 475 via at least one network 410. The network 410 can include any communications medium for transmitting information between two or more computing devices. For example, the network 410 can include a wireless local area network (WLAN) capability (e.g., cellular) or any other wireless or mobile communication capability now known or hereinafter developed.

The fleet management system 415 includes an orchestrator 420, which is configured to coordinate operations of the ecosystem 400, including remotely coordinating operations of the autonomous vehicle fleet 405. The orchestrator 420 is operatively coupled to, and configured to send instructions to, and receive instructions from or for, various subsystems of the fleet management system 415, including: a troubleshooting subsystem 425, a remote operations subsystem 430, a fleet operations subsystem 435, a fleet coordinator 440, an interface 450, and a job scheduler 460.

The job scheduler 460 is configured to assign jobs to the autonomous vehicles 101 based on a variety of considerations, including, e.g., constraints for the autonomous vehicles 101 and any human operators and/or physical infrastructure required to compete each job. A "job" is any action to be completed by, or with, the autonomous vehicle 101. Certain jobs may be completed fully autonomously by the autonomous vehicle 101, while other jobs may require at least some involvement by a human. Each job may include one or more tasks or a series of one or more tasks. For example, a job of transporting a package from a first location to a second location may include several tasks, including (among other things): starting the vehicle, procuring the package, identifying a preferred path from the first location to the second location, moving the vehicle along the preferred path to the second location, and providing the package to a designated recipient.

Each job may involve activities that are relevant to fleet operations, vehicle operations, or other matters. For example, certain jobs can include support and maintenance activities, like completing a calibration, charging a battery, updating a map or other software, cleaning an interior or exterior of the vehicle, troubleshooting a problem, providing remote assistance and/or control to a vehicle, etc. As would be recognized by a person of ordinary skill in the art, the jobs and tasks described herein are illustrative and should not be construed as being limiting in any way. For example, job assignments may include considerations of route locations, route driving times, route distances, vehicle locations, vehicle ranges, vehicle charging statuses/needs, parking needs, vehicle storage capacities, capabilities, and/or configurations, relative job priorities, any associations between particular vehicles and particular job sites, etc.

In an example embodiment, the job scheduler 460 is configured to cooperate with the orchestrator 420 and other subsystems of the fleet management system 415 to create and/or change job assignments dynamically. For example, during job planning or execution, the job scheduler 460 may create and/or change job assignments to resolve issues as they arise or to increase operational efficiencies. The job scheduler 460 may operate autonomously or via input from one or more operators. For example, one or more operators may interact with the job scheduler 460 via a user interface provided by the job scheduler 460 to schedule jobs and assign them to autonomous vehicles 101.

A database 445 includes data stores or storage structures (e.g., files, databases, data structures, data or other repositories, etc.) that are configured to store information. In an example embodiment, the database 445 is configured to store information regarding various different types of potential jobs, tasks associated with the different types of potential jobs, software and associated information, patches, logs, etc. for assisting/operating the autonomous vehicles 101, known constraints for the autonomous vehicles 101, operators, and physical infrastructure. The job scheduler 460 also can store in the database 445 information regarding assigned jobs, such as relative priorities of the jobs, an expected start time and completion time for each job and task thereof, an identity of each vehicle/system/operator associated with each job/task, and any software or other resources required to complete each job/task. For example, the job scheduler 460 may reference information in the database 445 when assigning jobs, and the job scheduler 460, orchestrator 420, and/or one or more other subsystems of the fleet management system 415 may use information from the database 445 for coordinating and executing jobs/tasks, etc. Though depicted in FIG. 4 as being located within the fleet management system 415, it should be recognized that the database 445 could be located remote from the fleet management system 415, e.g., in a cloud or data center solution, in alternative example embodiments.

The orchestrator 420 is configured to monitor completion of assigned jobs and coordinate completion of tasks by the autonomous vehicles 101 and the other subsystems of the fleet management system 415 in order to enable completion of the assigned jobs. The orchestrator 420 can identify, for each job (or type of job), a plurality of tasks to be completed. For example, the database 445 can include, and the orchestrator 420 can read, consider, and where appropriate, provide, or cause to be provided, to the autonomous vehicles 101 or one or more systems internal or external to the fleet management system 415, information indicating tasks to be performed for each job (or type of job), information indicating each subsystem (or the vehicle, if applicable) responsible for completing and/or coordinating each task, any software or other resources required to complete each job/task, and any other information or materials necessary or desirable for facilitating completion of the tasks.

The troubleshooting subsystem 425 is configured to obtain information from the autonomous vehicles 101 that indicates whether any of the autonomous vehicles 101 have issues, e.g., health issues, that are affecting, or are about to affect, the ability of the autonomous vehicles 101 to function. For example, the autonomous vehicles 101 may be configured to self-report issues or may be configured to provide general information from which the troubleshooting subsystem 425 may detect issues. The troubleshooting subsystem 425 can process information from the autonomous vehicles 101 to diagnose and address issues. In an example embodiment, the troubleshooting subsystem 425 may be configured to diagnose and address certain issues fully autonomously and to escalate certain other issues for input and/or action by a human operator via a user interface provided by the troubleshooting subsystem 425. For example, the troubleshooting subsystem 425 may be configured to diagnose and address certain predefined health issues using information in the database 445. The troubleshooting subsystem 425 also may be configured to coordinate with the orchestrator 420 to cause one or more rescue or replacement vehicles to be dispatched as needed.

The remote operations subsystem 430 is configured to provide remote assistance to the autonomous vehicles 101. In particular, the remote operations subsystem 430 includes a vehicle control system 490, which is configured to effectively seize control of the autonomous vehicle 101, e.g., through a teleoperations or remote control mechanism, and a vehicle assistance system 495, which is configured to provide assistance (e.g., supervision and/or input) to the autonomous vehicles 101 without taking control of the autonomous vehicles 101. Though illustrated in FIG. 4 as distinct systems, the vehicle control system 490 and vehicle assistance system 495 may share certain operational and logical components. For example, the vehicle control system 490 and vehicle assistance system 495 can share certain communication/processing equipment and a human operation station through which a human operator can operate, remotely control, and remotely assist an autonomous vehicle 101. As described in more detail below in connection with FIGS. 5 and 6, the human operation station can include, for example, a driver seat, a steering wheel, brake and acceleration pedals, a gear shifter, and a visual interface that is configured to allow a human operator to view an environment in which an autonomous vehicle 101 is driving. In addition, or in the alternative, the human operation station can include a handheld or other remote controlled device through which a human can drive or otherwise control or assist an autonomous vehicle 101.

In an example embodiment, the remote operations subsystem 430 may take control over, and/or provide assistance to, an autonomous vehicle 101 in response to a request for such action by the autonomous vehicle 101 or based on a behavior or situation observed by the fleet management system 415. For example, the orchestrator 420 may cause the remote operations subsystem 430 to take control over, and/or provide assistance to, the autonomous vehicle 101 in response to a determination that the autonomous vehicle 101 is unable to safely and/or effectively complete a particular job or task autonomously. In an example embodiment, the orchestrator 420 may coordinate operations between the remote operations subsystem 430, the troubleshooting subsystem 425, the fleet operations subsystem 435, and the fleet coordinator 440 to effectively decommission and recover autonomous vehicles 101 in need of service.

The fleet operations subsystem 435 is configured to coordinate maintenance and servicing of autonomous vehicles 101 in the fleet 405. For example, the fleet operations subsystem 435 can schedule and coordinate planned (e.g., routine) and unplanned (e.g., emergency) servicing, cleaning, charging, and other maintenance activities. The fleet operations subsystem 435 also may be configured to remotely start the autonomous vehicles 101 from a dormant state, e.g., through a "one-click" or other remote startup operation. For example, the fleet operations subsystem 435 may determine, based on health and/or configuration information for an autonomous vehicle 101 and/or a job associated with the autonomous vehicle 101, whether the autonomous vehicle 101 is ready to operate.

The fleet operations subsystem 435 may operate autonomously or via input from one or more operators. For example, one or more operators may interact with the fleet operations subsystem 435 via a user interface provided by the fleet operations subsystem 435 to view, update, and take action with respect to maintenance and servicing information for the autonomous vehicles 101 and/or for groups of autonomous vehicles 101 within the fleet 405.

The fleet coordinator 440 is configured to oversee the general operations of the autonomous vehicles 101 in the fleet 405 and to coordinate, via the orchestrator 420, with the job scheduler 460 and other subsystems of the fleet management system 415 to make any necessary scheduling or job assignment adjustments. For example, the fleet coordinator 440 may cause one or more jobs from a first autonomous vehicle 101 to be reassigned to at least one other autonomous vehicle 101 if the first autonomous vehicle 101 is removed from service. The fleet coordinator 440 also may coordinate delivery of a new, replacement autonomous vehicle 101 if an autonomous vehicle 101 is recovered.

The fleet coordinator 440 may operate autonomously or via input from one or more operators. For example, one or more operators may interact with the fleet coordinator 440 via a user interface provided by the fleet coordinator 440 to view, update, and take action with respect to status, health, and job information for the autonomous vehicles 101 and/or for groups of autonomous vehicles 101 within the fleet 405.

The interface 450 is configured to enable interactions between the fleet management system 415 and at least one external system 475 of an entity 455. The entity 455 may be a customer, partner, or other person or company/enterprise that receives, provides, or facilitates the provision of goods or services in connection with the autonomous vehicles 101. In an example embodiment, a computing device 480 of the entity 455 can view, update, and take action with respect to autonomous vehicles 101 and/or jobs/tasks associated with the entity 455 via the interface 450. For example, the interface 450 can provide a graphical user interface through which a customer, partner, or other entity 455 can view current status information regarding a pending or completed job, a particular autonomous vehicle 101 or group of autonomous vehicles 101, etc.

In addition to, or in lieu of, providing a user interface, the interface 450 can communicate with the computing device 480 to provide and/or collect information associated with the autonomous vehicles 101, jobs/tasks, etc. For example, the interface 450 can receive and answer questions from an operator of the computing device 480. The interface 450 may operate autonomously or via input from one or more operators of the fleet management system 415. For example, the interface 450 may provide a user interface through which one or more operators may interact to communicate with the external system 475.

Each computing device 480 includes a computer or processing system, such as a desktop, laptop, tablet, phone, or other mobile or non-mobile device. Each computing device 480 may include, for example, one or more types of displays (e.g., a screen or monitor) and input devices (e.g., a keyboard, mouse, voice recognition, etc.) to enter and/or view information. Each computing device 480 includes software 485, such as an internet browser or software application, through which the computing device 480 communicates with the interface 450.

Figure 5:
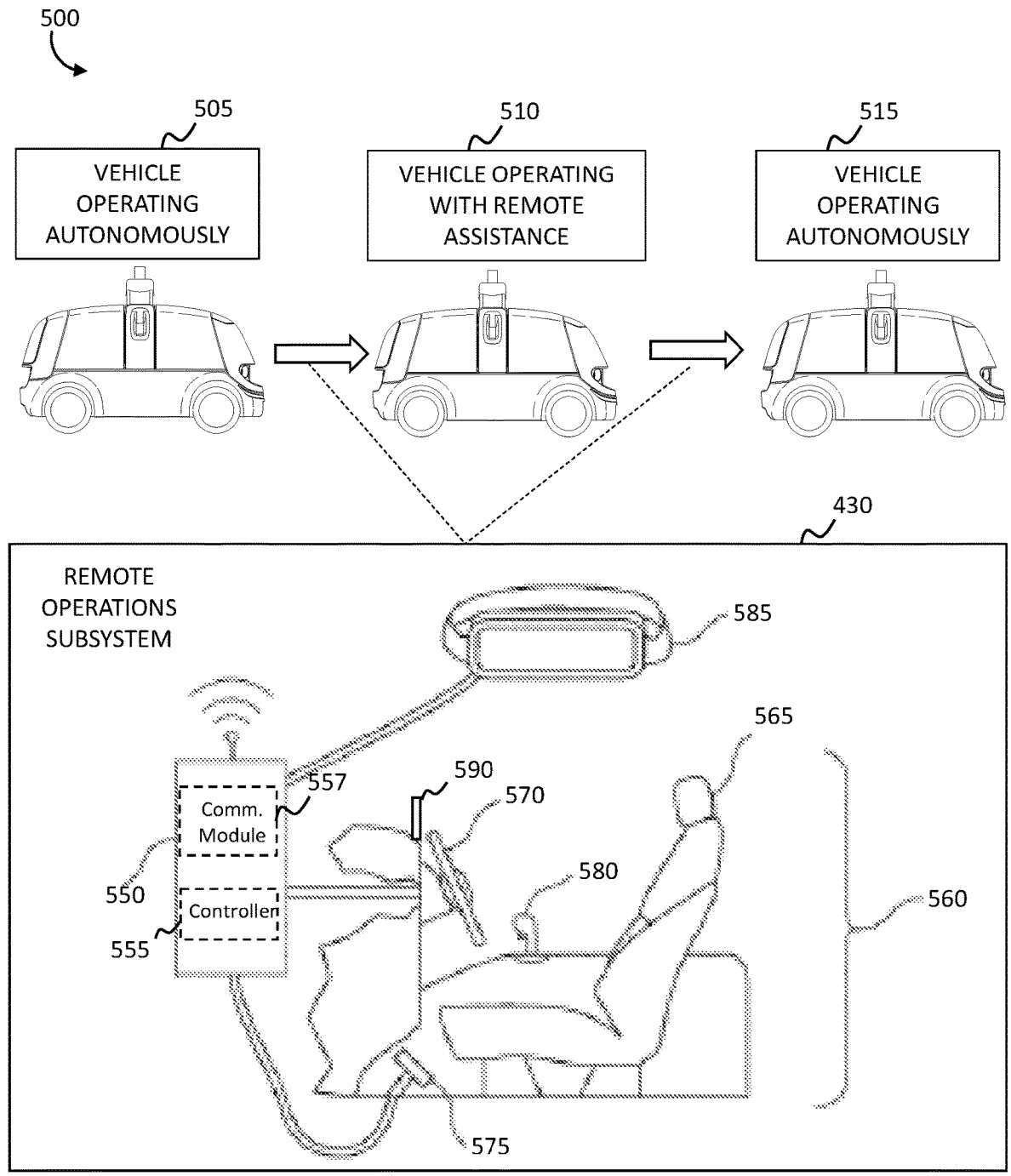
FIG. 5 is a diagram depicting an operational flow and remote operations subsystem for providing remote assistance to an autonomous vehicle, according to an example embodiment.
Figure 6:
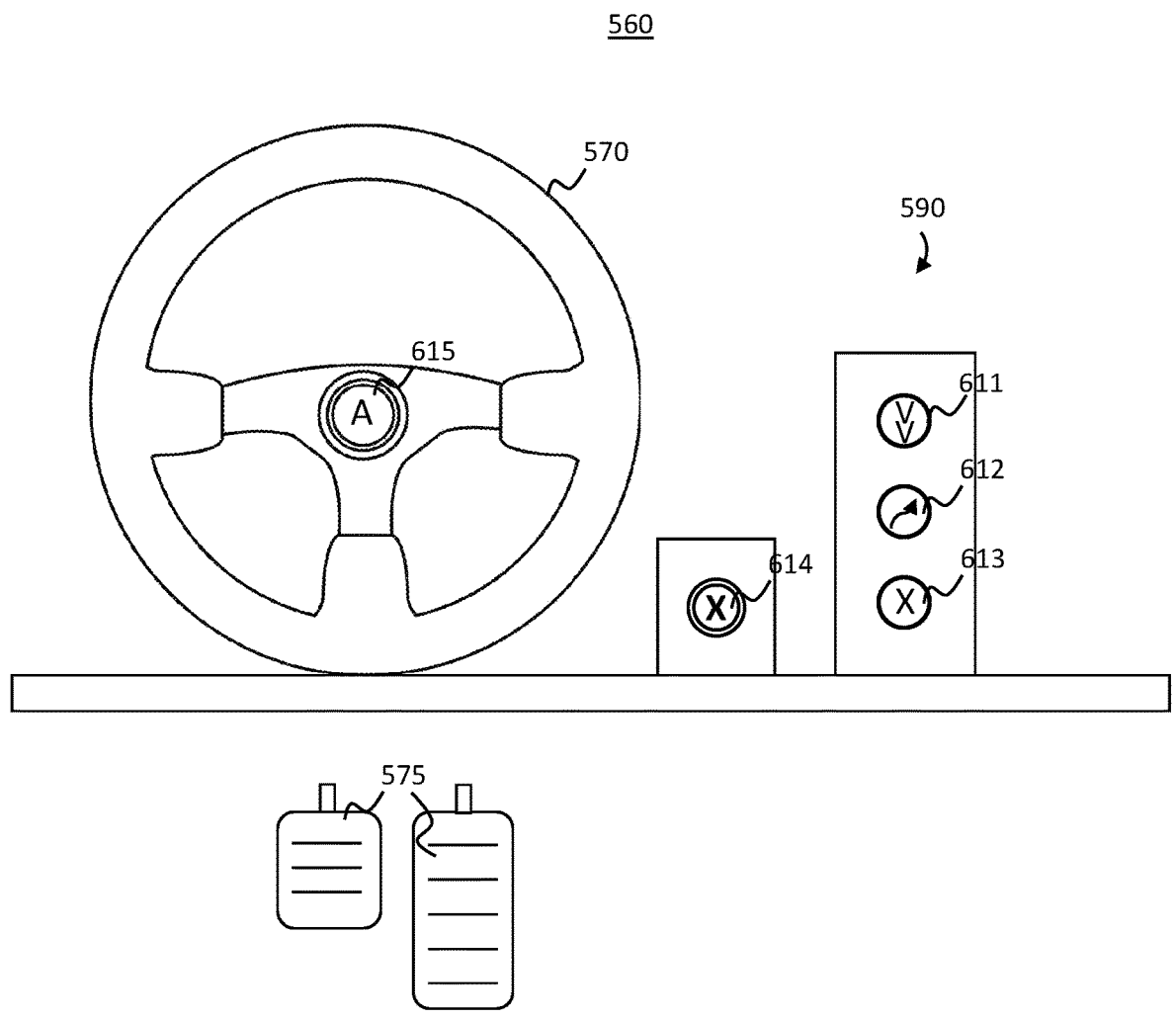
FIG. 6 is a diagram illustrating components of a human operator station of a remote operations subsystem, according to an example embodiment.

FIG. 5 is a diagram depicting an operational flow 500 and remote operations subsystem 430 for providing remote assistance to an autonomous vehicle, according to an example embodiment. The remote operations subsystem 430 includes a computing device 550 and a human operator station 560. FIG. 6 illustrates in more detail the human operator station 560, according to an example embodiment. FIGS. 5 and 6 are described together for ease of description.

The human operator station 560 includes components, which generally resemble a driver station in a typical vehicle. For example, the human operator station 560 can include a driver seat 565, a steering wheel 570, brake and acceleration pedals 575, and a gear shifter 580. These components may be physically similar to corresponding components of a typical vehicle. For example, the driver seat 565, steering wheel 570, brake and acceleration pedals 575, and gear shifter 580 can have sizes and shapes that are generally in line with sizes and shapes of a driver seat, steering wheel, brake and acceleration pedals, and gear shifter, respectively, of a typical vehicle.

The human operator station 560 also includes a visual interface 585 configured to allow a human operator to view the autonomous vehicle and/or an environment in which the autonomous vehicle is operating. In an example embodiment, the visual interface 585 includes a virtual-reality (VR) or augmented-reality (AR) headset. However, the visual interface 585 is not limited to being a VR or AR headset. For example, in an alternative example embodiment, the visual interface 585 can include one or more display screens, such as a light-emitting diode (LED), liquid crystal display (LCD), organic light-emitting diode (OLED) or other type of display now known or hereinafter developed. The visual interface 585 can be configured to display any number of different views of the autonomous vehicle and/or the environment of the autonomous vehicle, e.g., based on sensor data provided by the autonomous vehicle or one or more objects or systems external to the autonomous vehicle, such as another autonomous vehicle in a fleet to which the autonomous vehicle belongs. For example, the visual interface 585 can be configured to display front views, side views, rear views, etc., of the autonomous vehicle and/or the environment of the autonomous vehicle.

The human operator station 560 can be configured to have an approximate touch response of an actual driver station in a vehicle. For example, the steering wheel 570 may be configured to have a touch response that is similar to that of power steering in an actual vehicle, and the brake and acceleration pedals 575 may be configured to approximate the resistance of brake and acceleration pedals in an actual vehicle. Thus, the human operator station 560 may provide a configuration in which a human operator feels substantially like they would feel if they were actually located in the autonomous vehicle. In an example embodiment, the human operator station 560 can include additional features, like speakers playing sounds from the autonomous vehicle, to further provide a realistic atmosphere for the human operator.

In an example embodiment, the human operator station 560 can include one or more buttons 590 configured to be selectively activated by a human operator to cause remote assistance (e.g., supervision/input or control) to be provided to the autonomous vehicle or to cease provision of remote assistance. Each of the buttons 590 can include a physical eletromechanical input device, such as a button, switch, lever, pedal, or other device. Each of the buttons 590 can be dedicated to a different function.

For example, the buttons 590 can include a "deceleration" remote assistance button 611, which can be activated (e.g., by pressing) to cause an autonomous vehicle to autonomously decelerate to a predefined speed. For example, a controller 555 operatively coupled to the "deceleration" remote assistance button 611 can provide instructions and/or information (e.g., the predefined speed) to the autonomous vehicle to cause the autonomous vehicle to decelerate to the predefined speed. The autonomous vehicle can complete the deceleration autonomously, using the instructions and/or information provided by the controller 555, without a teleoperations or other remote control mechanism (or human operator) seizing control of the autonomous vehicle. Alternatively, the "deceleration" remote assistance button 611 may trigger a deceleration to be completed through teleoperations or another remote control mechanism.

In addition, or in the alternative, the buttons 590 can include a "pull over" remote assistance button 612, which can be activated (e.g., by pressing) to cause an autonomous vehicle to autonomously move to a safe location and decelerate to a stop. For example, the controller 555 operatively coupled to the "pull over" remote assistance button 612 can provide instructions and/or information to the autonomous vehicle to cause the autonomous vehicle to move to the safe location and decelerate to a stop. The autonomous vehicle can complete the pull over operation autonomously, using the instructions and/or information provided by the controller 555, without a teleoperations or other remote control mechanism (or human operator) seizing control of the autonomous vehicle. Alternatively, the "pull over" remote assistance button 612 may trigger a pull over to be completed through teleoperations or another remote control mechanism.

In addition, or in the alternative, the buttons 590 can include a "stop" remote assistance button 613, which can be activated (e.g., by pressing) to cause an autonomous vehicle to decelerate to a stop. For example, the controller 555 operatively coupled to the "stop" remote assistance button 613 can provide instructions and/or information to the autonomous vehicle to cause the autonomous vehicle to decelerate to a stop. The autonomous vehicle can complete the stop autonomously, using the instructions and/or information provided by the controller 555, without a teleoperations or other remote control mechanism (or human operator) seizing control of the autonomous vehicle. Alternatively, the "stop" remote assistance button 613 may trigger a stop to be completed through teleoperations or another remote control mechanism.

In addition, or in the alternative, the buttons 590 can include an "emergency stop" remote assistance button 614, which can be activated (e.g., by pressing) to cause an autonomous vehicle to decelerate to a substantially immediate stop. For example, the emergency stop can be completed more rapidly than a regular stop, such as a stop completed in connection with the "stop" remote assistance button 613 (which may provide a gentler rate of deceleration). For example, the controller 555 operatively coupled to the "emergency stop" remote assistance button 614 can provide instructions and/or information to the autonomous vehicle to cause the autonomous vehicle to decelerate to a stop. The autonomous vehicle can complete the stop autonomously, using the instructions and/or information provided by the controller, without a teleoperations or other remote control mechanism (or human operator) seizing control of the autonomous vehicle. Alternatively, the "emergency stop" remote assistance button 614 may trigger an emergency stop to be completed through teleoperations or another remote control mechanism.

In an example embodiment, when one of the buttons 611-614 is activated to cause an autonomous action by the autonomous vehicle, the controller 555 or one or more other components of the remote operations subsystem 430 or another subsystem of a fleet management system can monitor/supervise the autonomous vehicle as it completes the action. For example, the remote operations subsystem 430 can be on "standby" during the action, poised to seize control of the autonomous vehicle if needed.

In an example embodiment, the buttons 590 can further include an "autonomy" button 615, which can be activated (e.g., by pressing) to cease remote assistance and change (e.g., return) the autonomous vehicle to an (potentially fully) autonomous state. For example, if teleoperations or other remote control or assistance is being provided to an autonomous vehicle, the button 615 can be activated to cease that control and cause the autonomous vehicle to operate autonomously.

In an example embodiment, the brake and acceleration pedals 575 are configured to provide, in a teleoperations or remote control context, braking and acceleration functionality akin to brake and acceleration pedals in an autonomous vehicle. The brake and acceleration pedals 575 can be further configured such that, when one or both of the brake and acceleration pedals 575 are activated during an autonomous operation by the autonomous vehicle, the brake and acceleration pedals 575 transmit one or more signals to the controller 555 to cause control of the autonomous vehicle to be seized by the remote operations subsystem 430, e.g., for teleoperations or remote control.

As would be recognized by a person of ordinary skill in the art, the example functions, configurations, and locations of the buttons 590 (including buttons 611-615) and the acceleration and brake pedals 575 are illustrative and should not be construed as being limiting in any way. For example, the buttons 590 may be rearranged, formed as distinct components of the human operator station 560 or as integral features of one or more components of the human operator station 560, or there may be more or less buttons 590 and/or pedals 575, which may perform, more, less, or different functions, in alternative example embodiments. In addition, the ability to seize control of the autonomous vehicle (e.g., through teleoperations or remote control) may be included in one or more additional buttons or other devices, rather than the brake and acceleration pedals 575, in alternative example embodiments.

The human operator station 560 is operatively coupled to the computing device 550. The computing device 550 is a computer, server, or other computing device, which is configured to facilitate communications with, and/or operations involving, the autonomous vehicle, fleet management system subsystems, and/or one or more components of the human operator station 560. The computing device 550 includes one or more processors, memories, machine instructions, and/or hardware for processing and communicating information.

In an example embodiment, the computing device 550 includes a communications module 557 and the controller 555. The communications module 557 is configured to send and receive signals to and from the human operator station 560, the autonomous vehicle, and the other subsystems of the fleet management system. The communications module 557 can communicate using one or more different types of communications technologies such as Wi-Fi, cellular, wired communications, and/or other wired or wireless communication mechanisms now known or hereinafter developed.

The controller 555 is configured to process signals from the communications module 557 to enable remote assistance to be provided to the autonomous vehicle. For example, the controller 555 can be configured to process signals from the human operator station 560 and to translate the signals into control instructions for controlling the autonomous vehicle. In a teleoperations mode, for example, when a human operator turns or steers the steering wheel 570, the controller 555 can generate corresponding control instructions to be sent to the autonomous vehicle (via the communications module 557) to instruct the autonomous vehicle to turn or drive in a direction corresponding to the turning/steering of the human operator.

In addition, the controller 555 can be configured to detect activation of one or more of the buttons 590 and to cause a function associated with an activated button 590 to be executed. For example, the controller 555 can cause signals (e.g., instructions or information) to be sent to the autonomous vehicle (via the communications module 557) to cause the autonomous vehicle to stop, decelerate, pull over, return to a (fully) autonomous mode, submit to a teleoperations mode, or take another action in response to detecting activation of one of the buttons 590. In an example embodiment, the controller 555 is further configured to process signals from the autonomous vehicle and/or other fleet management system subsystems to monitor behavior of the autonomous vehicle, e.g., for determining whether a need exists for remote assistance support and/or for confirming successful operation of one or more remote assistance functions.

The computing device 550 can be connected to one or more of the components of the human operator station 560 by one or more physical cables or other connections. In addition, or in the alternative, the computing device 550 can be wirelessly coupled to one or more of the components of the human operator station 560 using any suitable mechanism now known or hereinafter developed, such as Bluetooth or Wi-Fi. Each of the components of the human operator station 560 can be substantially directly connected to the computing device 550 or coupled to the computing device 550 through one or more intermediate devices and/or networks, e.g., wireless and/or cellular networks.

In a first step 505 of the example operation flow 500, an autonomous vehicle is operating autonomously. For example, the autonomous vehicle may be turned on and sitting idle, traveling from a first location to a second location, or taking another action. In a second step 510, the remote operations subsystem 430 provides remote assistance to the autonomous vehicle. For example, the remote operations subsystem 430 may take control over, and/or provide supervision/input to, the autonomous vehicle in response to a request for such action by the autonomous vehicle or based on a behavior or situation observed by the remote operations subsystem 430 and/or another subsystem of a fleet management system. For example, the remote operations subsystem 430 and/or other subsystem can observe the behavior or situation based on information provided by the autonomous vehicle or another object or system external to the autonomous vehicle, such as another autonomous vehicle in a fleet to which the autonomous vehicle belongs. Alternatively, a human operator can manually trigger a signal to the controller 555 to cause remote assistance to be provided by pressing one of the buttons 590 (e.g., the "deceleration" remote assistance button 611, the "pull over" remote assistance button 612, the "stop" remote assistance button 613, the "emergency stop" remote assistance button 614, or one or both of the brake and acceleration pedals 575).

It may be advantageous, for example, for the remote operations subsystem 430 to take control over the autonomous vehicle in unstructured, low-speed environments or to mitigate issues that do not require a low latency (e.g., approximately two seconds or less) reaction. For example, remote control of the autonomous vehicle may be beneficial in response to changes in the environment or behavior of the autonomous vehicle, which would be better understood or addressed by a remote human operator. The remote human operator may, for example, have a better view and/or additional context for the changes than the autonomous vehicle (or a local human operator thereof). For example, a remote human operator may better understand a context for navigating around an accident scene, a crossing guard, police directing traffic, a flashing crosswalk, a pothole, a construction zone, or other hazard, or for addressing situational issues, like honking vehicles, emergency sirens, tailgating vehicles, etc.

Remote control also may be beneficial when a behavior of the autonomous vehicle can be observed and corrected by the remote human operator. For example, mechanical or other issues affecting an autonomous vehicle may cause the autonomous vehicle to unexpectedly engage in unsafe or otherwise inappropriate behavior. Certain of these behaviors, like striking or drifting towards curbs, may be suited for correction through remote control by a human operator.

In certain situations, it may be advantageous for the remote operations subsystem 430 to provide assistance, e.g., through supervision and/or provision of information or other input, without taking control of the autonomous vehicle. For example, in high-speed environments or in situations requiring low latency (e.g., approximately two seconds or less) reactions, it may be safer and/or more efficient for the autonomous vehicle to take action with assistance from the remote operations subsystem 430 than for a remote human operator to take the action. High speed reactions may be required, for example, in response to sudden changes in the environment of the autonomous vehicle, e.g., persons or objects entering a path of the autonomous vehicle, or in response to vehicle behavior that requires a fast reaction time, like juking, swerving, hard braking, indecision, etc. As would be recognized by a person of ordinary skill in the art, the environment and vehicle issues described herein, and the considerations for determining whether to address those issues through remote control vs. remote assistance, are illustrative and should not be construed as being limiting in any way.

After the remote operations subsystem 430 provides assistance in step 510, the autonomous vehicle can return to a (potentially fully) autonomous mode of operation in step 515. For example, the controller 555 can cause remote assistance to cease in response to determining, e.g., based on signals from the autonomous vehicle, the human operator station 560, and/or other subsystems of the fleet management system or another object or system external to the autonomous vehicle (e.g., another autonomous vehicle in the fleet), that there is no longer a need for remote assistance support. This determination may be made automatically by the controller 555, autonomous vehicle, human operator station 560, and/or subsystems, or the determination may be made with input from a human operator. For example, a human operator can manually trigger a signal to the controller 555 to cause remote assistance to cease by pressing one of the buttons 590 (e.g., the "autonomy" button 615).

Figure 7:
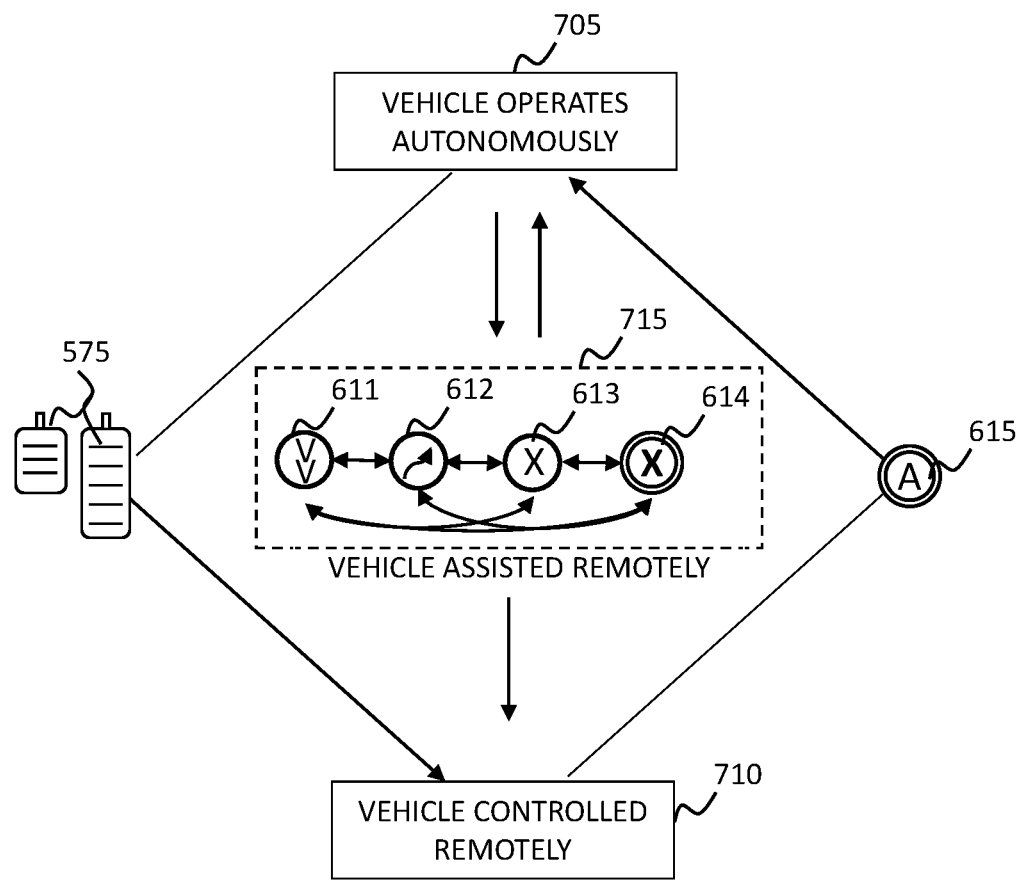
FIG. 7 is a diagram depicting an operational flow for a remote operations subsystem, according to an example embodiment.

FIG. 7 is a diagram depicting an operational flow 700 for the remote operations subsystem 430, according to an example embodiment. In particular, FIG. 7 illustrates different operational transitions that may be facilitated via remote assistance buttons 611-615 and brake and acceleration pedals 575 in an example embodiment. In a first operational state 705, an autonomous vehicle operates autonomously. For example, the autonomous vehicle may be turned on and sitting idle, traveling from a first location to a second location, or taking another action.

Activating (e.g., pressing) one or both of the brake and acceleration pedals 575 can cause a transition to a second operational state 710 in which the autonomous vehicle is remotely controlled by a remote operations subsystem, e.g., via teleoperations, remote control, or another mechanism. For example, pressing the brake and acceleration pedals 575 can cause one or more signals to be transmitted to a controller of the remote operations subsystem, which can cooperate with a remote operations controller of the autonomous vehicle to cause control of the autonomous vehicle to be seized by the remote operations subsystem.

Activating (e.g., pressing) an "autonomy" remote assistance button 615 can cause a transition back to the first operational state 705. For example, pressing the "autonomy" remote assistance button 615 can cause one or more signals to be transmitted to the controller of the remote operations subsystem, which can cooperate with the remote operations controller of the autonomous vehicle to cause the autonomous vehicle to change (e.g., return) to a (potentially fully) autonomous state.

Activation of one of the remote assistance buttons 611-614 can cause a transition from the first operational state 705 to a third operational state 715 in which the autonomous vehicle is operating with assistance from the remote operations subsystem. For example, activating (e.g., pressing) a "deceleration" remote assistance button 611 can cause one or more signals to be transmitted to the controller of the remote operations subsystem 430, which can cooperate with the remote operations controller of the autonomous vehicle to cause the autonomous vehicle to autonomously decelerate to a predefined speed. For example, the controller can provide instructions and/or information (e.g., the predefined speed) to the autonomous vehicle to cause the autonomous vehicle to decelerate to the predefined speed. Similarly, activating (e.g., pressing) a "pull over" remote assistance button 612 can cause one or more signals to be transmitted to the controller of the remote operations subsystem, which can cooperate with the remote operations controller of the autonomous vehicle to cause the autonomous vehicle to autonomously move to a safe location and decelerate to a stop; activating (e.g., pressing) a "stop" remote assistance button 613 can cause one or more signals to be transmitted to the controller of the remote operations subsystem, which can cooperate with the remote operations controller of the autonomous vehicle to cause the autonomous vehicle to autonomously decelerate to a stop; and activating (e.g., pressing) an "emergency stop" remote assistance button 614 can cause one or more signals to be transmitted to the controller of the remote operations subsystem, which can cooperate with the remote operations controller of the autonomous vehicle to cause the autonomous vehicle to autonomously decelerate to an emergency stop.

In the third operational state 715, the autonomous vehicle can complete the action associated with the activated remote assistance button (611, 612, 613, or 614) autonomously, using the instructions and/or information provided by the controller, without a teleoperations or other remote control (or human operator) seizing control of the autonomous vehicle. However, the remote operations subsystem is configured to enable a transition from the third operational state 715 to the first operational state 705 or the second operational state 710 in response to activation of (a) the "autonomy" remote assistance button 615, or (b) one or more of the brake and acceleration pedals 575, respectively.

Figure 8:
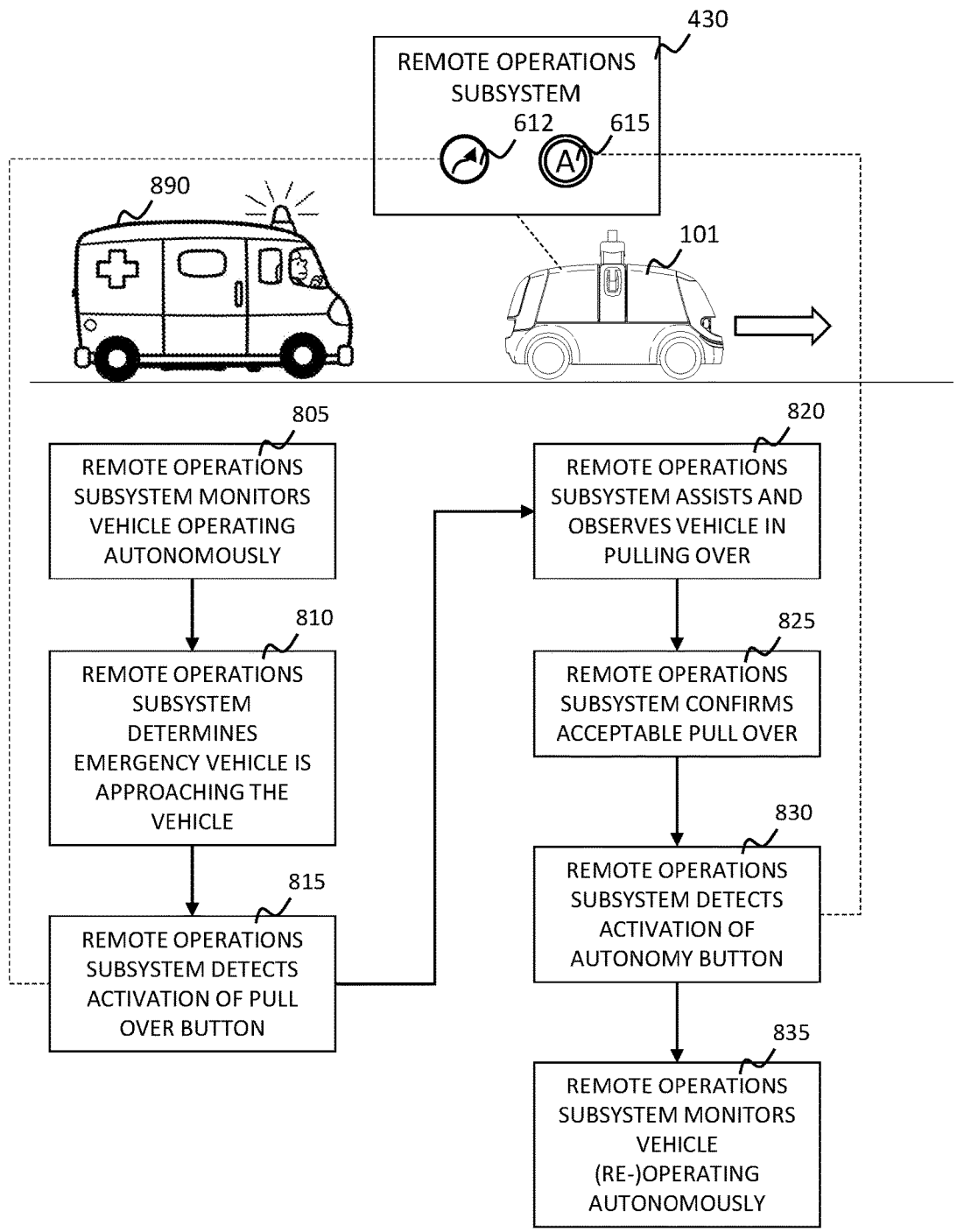
FIG. 8 is a diagram depicting an operational flow for providing remote assistance to an autonomous vehicle, according to an example embodiment.

As would be recognized by a person of ordinary skill in the art, the example functions, number of instances, and configurations of the buttons 611-615 and the acceleration and brake pedals 575 are illustrative and should not be construed as being limiting in any way. For example, there may be more or less buttons 611-615 and/or pedals 575, which may perform, more, less, or different functions, in alternative example embodiments. [ow] FIG. 8 is a diagram depicting an operational flow 800 for providing remote assistance to an autonomous vehicle 101, according to an example embodiment. In step 805, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 810, the remote operations subsystem 430 determines that an emergency vehicle 890 is approaching the autonomous vehicle 101. For example, the remote operations subsystem 430 may detect the emergency vehicle 890 by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can detect the emergency vehicle 890 and provide information regarding the emergency vehicle 890 to the remote operations subsystem 430, e.g., as part of an information stream or as part of a request for help.

In step 815, the remote operations subsystem 430 detects activation of a "pull over" remote assistance button 612. For example, a human operator associated with the remote operations subsystem 430 can press the "pull over" remote assistance button 612 in response to detecting the emergency vehicle 890 in step 810.

In step 820, the remote operations subsystem 430 assists and observes the autonomous vehicle 101 in pulling over. For example, a controller of the remote operations subsystem 430 can cooperate with a remote operations controller of the autonomous vehicle 101 to cause the autonomous vehicle 101 to autonomously move to a safe location and decelerate to a stop. The safe location may be determined by the autonomous vehicle 101 and/or the remote operations subsystem 430, e.g., based on map information and/or sensor information. For example, the controller may provide the safe location to the autonomous vehicle 101 or the autonomous vehicle 101 may determine the safe location itself. The remote operations subsystem 430 may observe the autonomous vehicle 101 pulling over, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 825, the remote operations subsystem 430 confirms that the autonomous vehicle 101 has completed an acceptable pull over operation. In step 830, the remote operations subsystem 430 detects activation of an "autonomy" remote assistance button 615. For example, the human operator associated with the remote operations subsystem 430 can press the "autonomy" remote assistance button 615 to cease remote assistance and change (i.e., return) the autonomous vehicle 101 to an autonomous state.

For example, the controller of the remote operations subsystem 430 can cooperate with the remote operations controller of the autonomous vehicle 101 to cause the autonomous vehicle 101 to change to the autonomous state. In step 835, the remote operations subsystem 430 continues to monitor the autonomous vehicle 101, which is now (re-) operating autonomously.

It should be appreciated that the operations depicted in FIG. 8 are illustrative and additional, less, or different operations could be completed in alternative example embodiments. For example, instead of executing a pullover action in response to the determination in step 810 that the emergency vehicle 890 was approaching, another action, such as activation of remote control by a remote operations subsystem, could be executed to cause the autonomous vehicle 101 to navigate away from the emergency vehicle 890.

Figure 9:
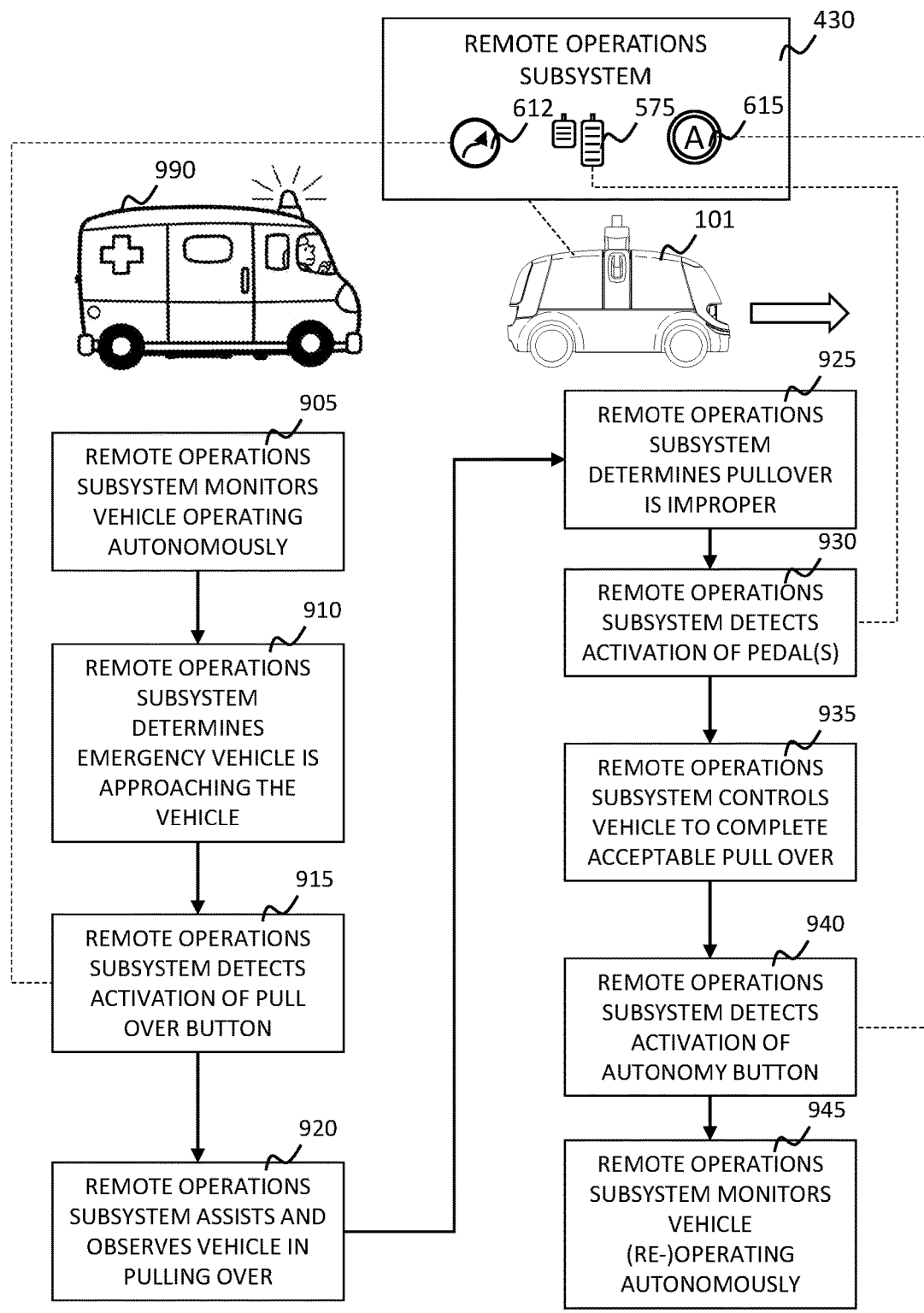
FIG. 9 is a diagram depicting an operational flow for providing remote assistance to an autonomous vehicle, according to another example embodiment.

FIG. 9 is a diagram depicting an operational flow 900 for providing remote assistance to an autonomous vehicle 101, according to another example embodiment. In step 905, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 910, the remote operations subsystem 430 determines that an emergency vehicle 990 is approaching the autonomous vehicle 101. For example, the remote operations subsystem 430 may detect the emergency vehicle 990 by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can detect the emergency vehicle 990 and provide information regarding the emergency vehicle 990 to the remote operations subsystem 430, e.g., as part of an information stream or as part of a request for help.

In step 915, the remote operations subsystem 430 detects activation of a "pull over" remote assistance button 612. For example, a human operator associated with the remote operations subsystem 430 can press the "pull over" remote assistance button 612 in response to detecting the emergency vehicle 990 in step 910.

In step 920, the remote operations subsystem 430 assists and observes the autonomous vehicle 101 in pulling over. For example, a controller of the remote operations subsystem 430 can cooperate with a remote operations controller of the autonomous vehicle 101 to cause the autonomous vehicle 101 to autonomously move to a safe location and decelerate to a stop. The safe location may be determined by the autonomous vehicle 101 and/or the remote operations subsystem 430, e.g., based on map information and/or sensor information. For example, the controller may provide the safe location to the autonomous vehicle 101 or the autonomous vehicle 101 may determine the safe location itself. The remote operations subsystem 430 may observe the autonomous vehicle 101 pulling over, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 925, the remote operations subsystem 430 determines that the autonomous vehicle 101 has not completed an acceptable pull over operation. For example, the autonomous vehicle 101 may still be in a path of the emergency vehicle 990. In step 930, the remote operations subsystem 430 detects activation of one or more of a set of brake and acceleration pedals 575 of the remote operations subsystem 430. For example, the human operator associated with the remote operations subsystem 430 can press one or more of the brake and acceleration pedals 575 in response to observing the autonomous vehicle 101 fail to complete the acceptable pull over operation, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 935, the remote operations subsystem 430 controls operation of the autonomous vehicle 101 to complete an acceptable pull over. For example, the human operator can complete the pull over using a teleoperations or remote control capability of the remote operations subsystem 430, e.g., by using the brake and acceleration pedals 575 and/or a steering wheel or other components to complete the pull over operation. In step 940, the remote operations subsystem 430 detects activation of an "autonomy" remote assistance button 615. For example, the human operator can press the "autonomy" remote assistance button 615 to cease remote assistance (including, in this case, remote control) and change (i.e., return) the autonomous vehicle 101 to an autonomous state. For example, the controller of the remote operations subsystem 430 can cooperate with the remote operations controller of the autonomous vehicle 101 to cause the autonomous vehicle 101 to change to the autonomous state. In step 945, the remote operations subsystem 430 continues to monitor the autonomous vehicle 101, which is now (re-)operating autonomously.

It should be appreciated that the operations depicted in FIG. 9 are illustrative and additional, less, or different operations could be completed in alternative example embodiments. For example, instead of executing a pullover action in response to the determination in step 910 that the emergency vehicle 990 was approaching, another action, such as activation of remote control by a remote operations subsystem, could be executed to cause the autonomous vehicle 101 to navigate away from the emergency vehicle 990.

Figure 10:
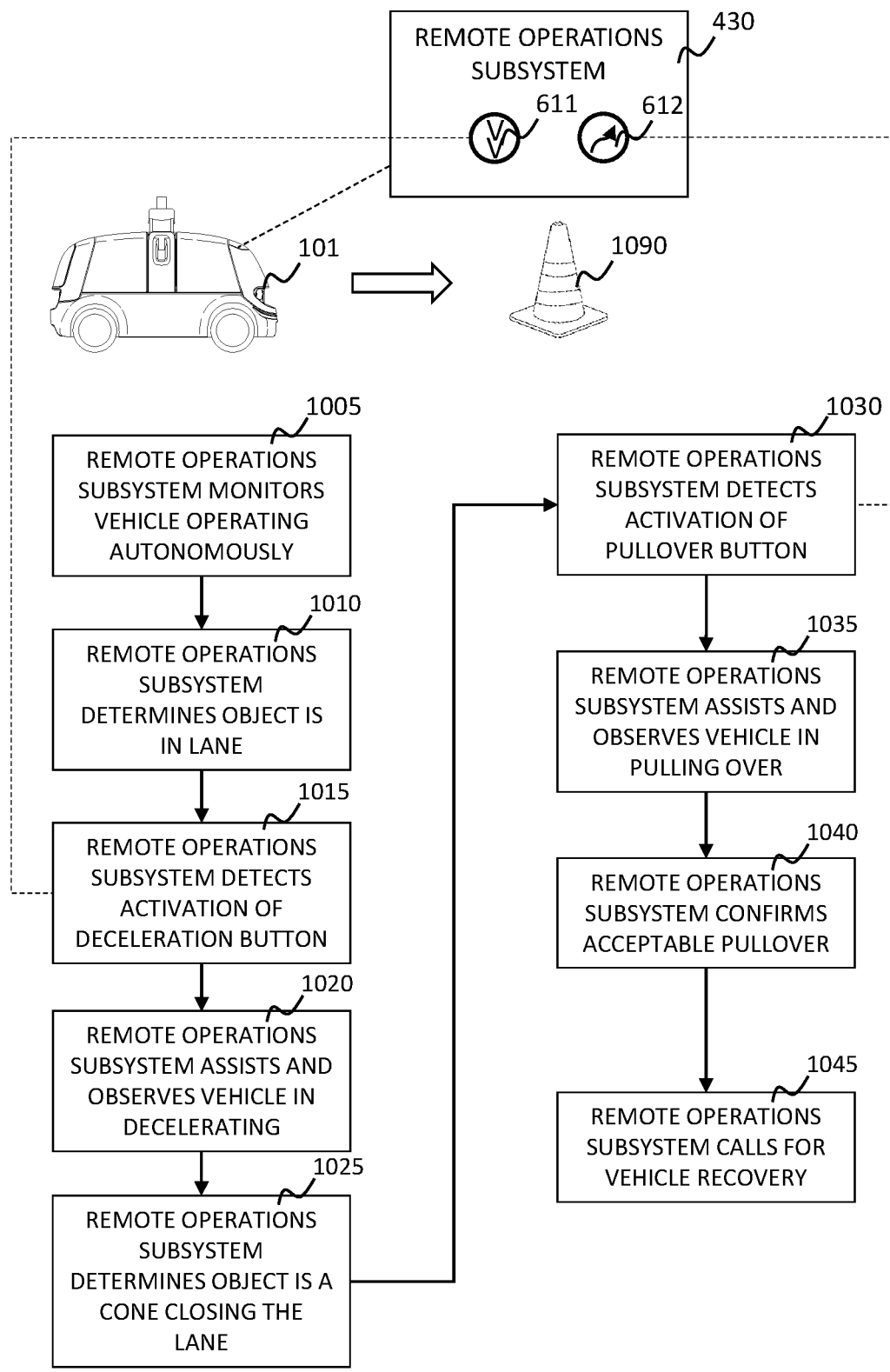
FIG. 10 is a diagram depicting an operational flow for providing remote assistance to an autonomous vehicle, according to yet another example embodiment.

FIG. 10 is a diagram depicting an operational flow 1000 for providing remote assistance to an autonomous vehicle 101, according to yet another example embodiment. In step 1005, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1010, the remote operations subsystem 430 determines that an unknown object 1090 is in a lane in which the autonomous vehicle 101 is traveling. For example, the remote operations subsystem 430 may detect the object 1090 by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can detect the object 1090 and provide information regarding the object 1090 to the remote operations subsystem 430, e.g., as part of an information stream or as part of a request for help.

In step 1015, the remote operations subsystem 430 detects activation of a "deceleration" remote assistance button 611. For example, a human operator associated with the remote operations subsystem 430 can press the "deceleration" remote assistance button 611 in response to detecting the object 1090 in step 1010.

In step 1020, the remote operations subsystem 430 assists and observes the autonomous vehicle 101 in decelerating. For example, a controller of the remote operations subsystem 430 can cooperate with a remote operations controller of the autonomous vehicle 101 to cause the autonomous vehicle 101 to autonomously decelerate to a predefined speed (e.g., a slow or moderate speed, such as 15 mph or 20 mph, though the predefined speed could be any speed). For example, the controller may provide the predefined speed to the autonomous vehicle 101 or the autonomous vehicle 101 may determine the predefined speed itself. The remote operations subsystem 430 may observe the autonomous vehicle 101 decelerating, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1025, the remote operations subsystem 430 determines that the object 1090 is a cone closing the lane in which the autonomous vehicle 101 is traveling. For example, the remote operations subsystem 430 may make this determination by reading and/or processing, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). For example, the remote operations subsystem 430 can process images of the object 1090 through one or more computer vision or other processing algorithms or models to determine that the object 1090 is a cone and/or to determine a size and/or location of the object 1190 relative to the lane and/or autonomous vehicle 101. Alternatively, the autonomous vehicle 101 can make this determination and provide information regarding the object 1090 to the remote operations subsystem 430, e.g., as part of an information stream or as part of a request for help.

In step 1030, the remote operations subsystem 430 detects activation of a "pull over" remote assistance button 612. For example, the human operator associated with the remote operations subsystem 430 can press the "pull over" remote assistance button 612 in response to the determination in step 1025 that the object 1090 is a cone.

In step 1035, the remote operations subsystem 430 assists and observes the autonomous vehicle 101 in pulling over. For example, the controller of the remote operations subsystem 430 can cooperate with the remote operations controller of the autonomous vehicle 101 to cause the autonomous vehicle 101 to autonomously move to a safe location and decelerate to a stop. The safe location may be determined by the autonomous vehicle 101 and/or the remote operations subsystem 430, e.g., based on map information and/or sensor information. For example, the controller may provide the safe location to the autonomous vehicle 101 or the autonomous vehicle 101 may determine the safe location itself. The remote operations subsystem 430 may observe the autonomous vehicle 101 pulling over, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1040, the remote operations subsystem 430 confirms that the autonomous vehicle 101 has completed an acceptable pull over operation. In step 1045, the remote operations subsystem 430 calls for recovery of the autonomous vehicle 101, e.g., via one or more other subsystems of the fleet management system. For example, the remote operations subsystem 430 can call for recovery based on an expectation that the autonomous vehicle 101 will not be able to navigate around the object 1090 within a threshold amount of time and, therefore, must be deactivated and removed from service. Alternatively, the remote operations subsystem 430 could allow the autonomous vehicle 101 to stay pulled over until it is safe for the autonomous vehicle 101 to resume operating.

It should be appreciated that the operations depicted in FIG. 10 are illustrative and additional, less, or different operations could be completed in alternative example embodiments. For example, instead of executing a pullover action in response to the determination in step 1025 that the object 1090 is a cone, another action, such as activation of remote control by a remote operations subsystem, could be executed to cause the autonomous vehicle 101 to navigate around the object 1090.

Figure 11:
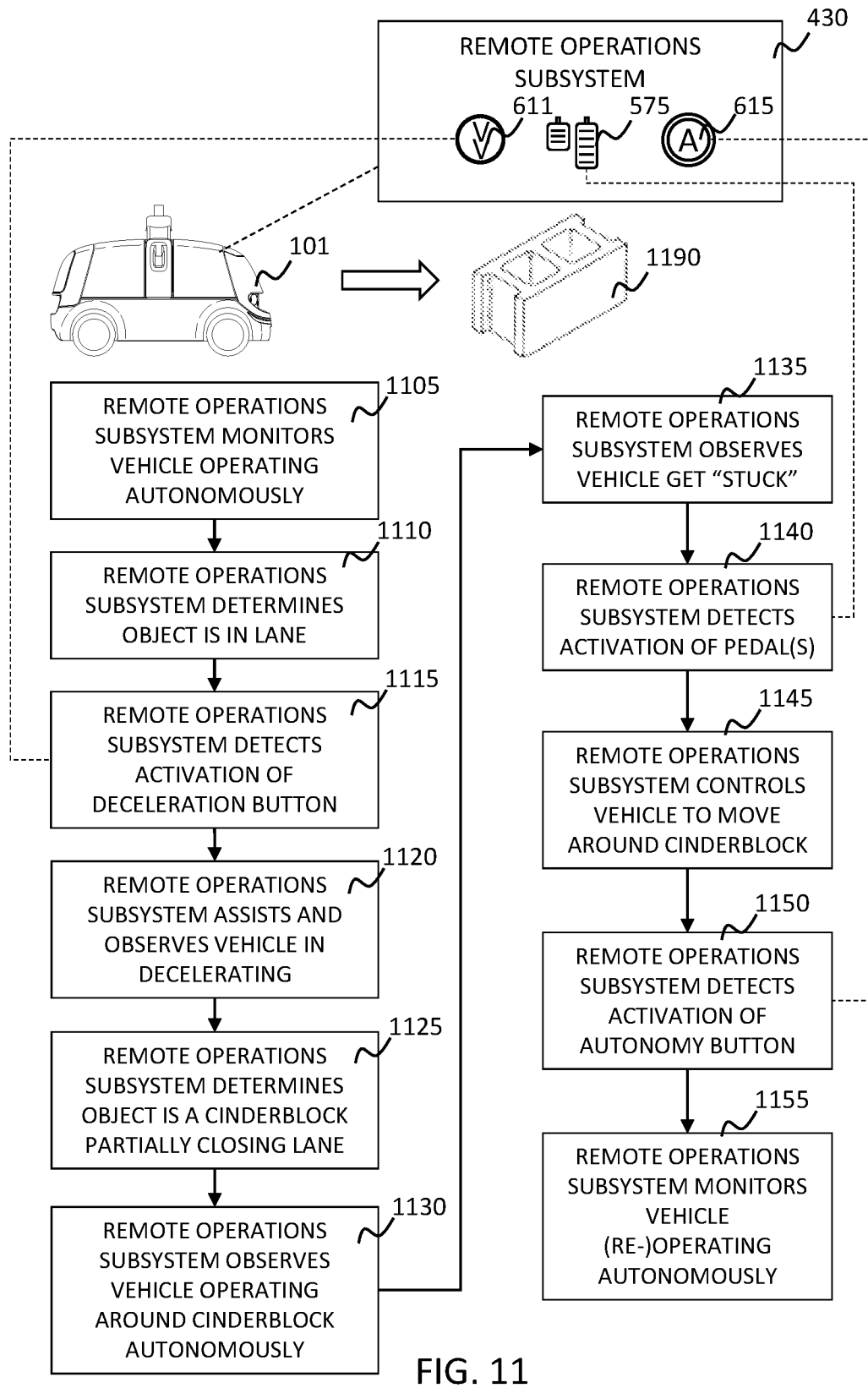
FIG. 11 is a diagram depicting an operational flow for providing remote assistance to an autonomous vehicle, according to yet another example embodiment.

FIG. 11 is a diagram depicting an operational flow 1100 for providing remote assistance to an autonomous vehicle 101, according to yet another example embodiment. In step 1105, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1110, the remote operations subsystem 430 determines that an unknown object 1190 is in a lane in which the autonomous vehicle 101 is traveling. For example, the remote operations subsystem 430 may detect the object 1190 by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can detect the object 1190 and provide information regarding the object 1190 to the remote operations subsystem 430, e.g., as part of an information stream or as part of a request for help.

In step 1115, the remote operations subsystem 430 detects activation of a "deceleration" remote assistance button 611. For example, a human operator associated with the remote operations subsystem 430 can press the "deceleration" remote assistance button 611 in response to detecting the object 1190 in step 1110.

In step 1120, the remote operations subsystem 430 assists and observes the autonomous vehicle 101 in decelerating. For example, a controller of the remote operations subsystem 430 can cooperate with a remote operations controller of the autonomous vehicle 101 to cause the autonomous vehicle 101 to autonomously decelerate to a predefined speed (e.g., a slow or moderate speed, such as 15 mph or 20 mph, though the predefined speed could be any speed). For example, the controller may provide the predefined speed to the autonomous vehicle 101 or the autonomous vehicle 101 may determine the predefined speed itself. The remote operations subsystem 430 may observe the autonomous vehicle 101 decelerating, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1125, the remote operations subsystem 430 determines that the object 1190 is a cinderblock that is partially closing the lane in which the autonomous vehicle 101 is traveling. For example, the remote operations subsystem 430 may make this determination by reading and/or processing, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). For example, the remote operations subsystem 430 can process images of the object 1190 through one or more computer vision or other processing algorithms or models to determine that the object 1190 is a cinderblock and/or to determine a size and/or location of the object 1190 relative to the lane and/or autonomous vehicle 101. Alternatively, the autonomous vehicle 101 can make this determination and provide information regarding the object 1190 to the remote operations subsystem 430, e.g., as part of an information stream or as part of a request for help.

In step 1130, the remote operations subsystem 430 observes the autonomous vehicle 101 operating around the object 1190 autonomously. The autonomous vehicle 101 is attempting to navigate around the object 1190 without assistance or intervention from the remote operations subsystem 430. The remote operations subsystem 430 may observe the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1135, the remote operations subsystem 430 observes the autonomous vehicle 101 get "stuck" at the site of the object 1190. In step 1140, the remote operations subsystem 430 detects activation of one or more of a set of brake and acceleration pedals 575 of the remote operations subsystem 430. For example, the human operator associated with the remote operations subsystem 430 can press one or more of the brake and acceleration pedals 575 in response to observing the autonomous vehicle 101 get stuck, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1145, the remote operations subsystem 430 controls operation of the autonomous vehicle 101 to move the autonomous vehicle 101 around the object 1190. For example, the human operator can move the autonomous vehicle 101 using a teleoperations or remote control capability of the remote operations subsystem 430, e.g., by using the brake and acceleration pedals 575 and/or a steering wheel or other components to navigate the autonomous vehicle 101 around the object 1190.

In step 1150, the remote operations subsystem 430 detects activation of an "autonomy" remote assistance button 615. For example, the human operator can press the "autonomy" remote assistance button 615 to cease remote assistance (including, in this case, remote control) and change (i.e., return) the autonomous vehicle 101 to an autonomous state. For example, the controller of the remote operations subsystem 430 can cooperate with the remote operations controller of the autonomous vehicle 101 to cause the autonomous vehicle 101 to change to the autonomous state. In step 1155, the remote operations subsystem 430 continues to monitor the autonomous vehicle 101, which is now (re-) operating autonomously.

It should be appreciated that the operations depicted in FIG. 11 are illustrative and additional, less, or different operations could be completed in alternative example embodiments. For example, instead of observing the vehicle 101 attempt to operate around the cinderblock 1190 autonomously in step 1130, remote control by the remote operations subsystem could be initiated upon the determination in step 1125 to navigate around the object cinderblock 1190 through teleoperations or remote control without first attempting navigation through autonomy.

Figure 12:
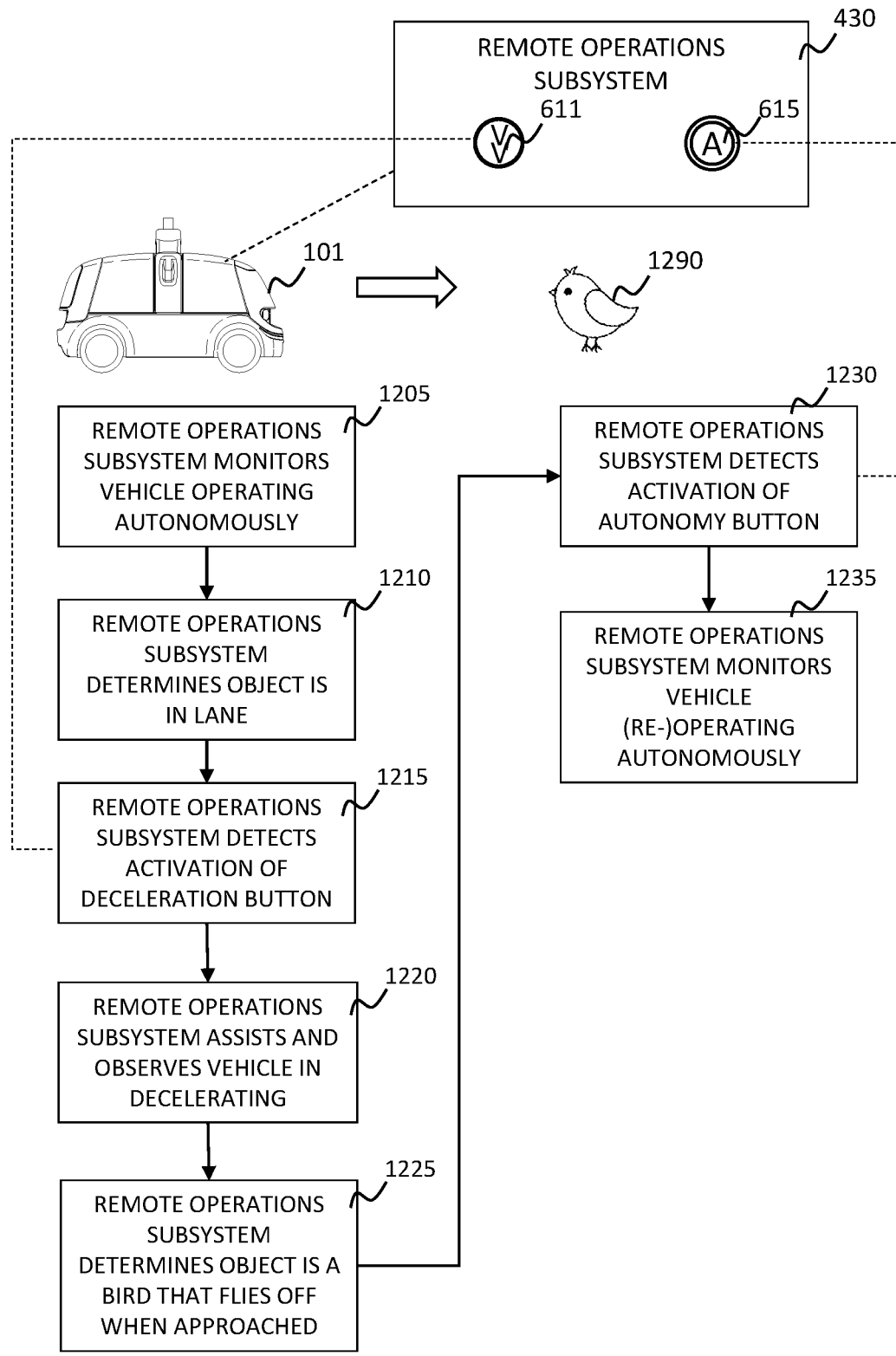
FIG. 12 is a diagram depicting an operational flow for providing remote assistance to an autonomous vehicle, according to yet another example embodiment.

FIG. 12 is a diagram depicting an operational flow 1200 for providing remote assistance to an autonomous vehicle 101, according to yet another example embodiment. In step 1205, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1210, the remote operations subsystem 430 determines that an unknown object 1290 is in a lane in which the autonomous vehicle 101 is traveling. For example, the remote operations subsystem 430 may detect the object 1290 by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can detect the object 1290 and provide information regarding the object 1290 to the remote operations subsystem 430, e.g., as part of an information stream or as part of a request for help.

In step 1215, the remote operations subsystem 430 detects activation of a "deceleration" remote assistance button 611. For example, a human operator associated with the remote operations subsystem 430 can press the "deceleration" remote assistance button 611 in response to detecting the object 1290 in step 1210.

In step 1220, the remote operations subsystem 430 assists and observes the autonomous vehicle 101 in decelerating. For example, a controller of the remote operations subsystem 430 can cooperate with a remote operations controller of the autonomous vehicle 101 to cause the autonomous vehicle 101 to autonomously decelerate to a predefined speed (e.g., a slow or moderate speed, such as 15 mph or 20 mph, though the predefined speed could be any speed). For example, the controller may provide the predefined speed to the autonomous vehicle 101 or the autonomous vehicle 101 may determine the predefined speed itself. The remote operations subsystem 430 may observe the autonomous vehicle 101 decelerating, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1225, the remote operations subsystem 430 determines that the object 1290 is a bird that flies off when approached. For example, the remote operations subsystem 430 may make this determination by reading and/or processing, automatically or via input from the human operator, sensor information (e.g., sound and/or images) from the autonomous vehicle 101, or using information provided by, or collected from, one or more other subsystems of a fleet management system or another object or system external to the autonomous vehicle (such as another autonomous vehicle in a fleet to which the autonomous vehicle 101 belongs). For example, the remote operations subsystem 430 can process images of the object 1290 through one or more computer vision or other processing algorithms or models to determine that the object 1290 is a bird and/or to determine a size and/or location of the object 1290 relative to the lane and/or autonomous vehicle 101. Alternatively, the autonomous vehicle 101 can make this determination and provide information regarding the object 1290 to the remote operations subsystem 430, e.g., as part of an information stream.

In step 1230, the remote operations subsystem 430 detects activation of an "autonomy" remote assistance button 615. For example, the human operator can press the "autonomy" remote assistance button 615 to cease remote assistance (in view of the fact that the object 1290 is no longer in the path of the autonomous vehicle 101) and change (i.e., return) the autonomous vehicle 101 to an autonomous state. For example, the controller of the remote operations subsystem 430 can cooperate with the remote operations controller of the autonomous vehicle 101 to cause the autonomous vehicle 101 to change to the autonomous state. In step 1235, the remote operations subsystem 430 continues to monitor the autonomous vehicle 101, which is now (re-)operating autonomously.

It should be appreciated that the operations depicted in FIG. 12 are illustrative and additional, less, or different operations could be completed in alternative example embodiments.

Figure 13:
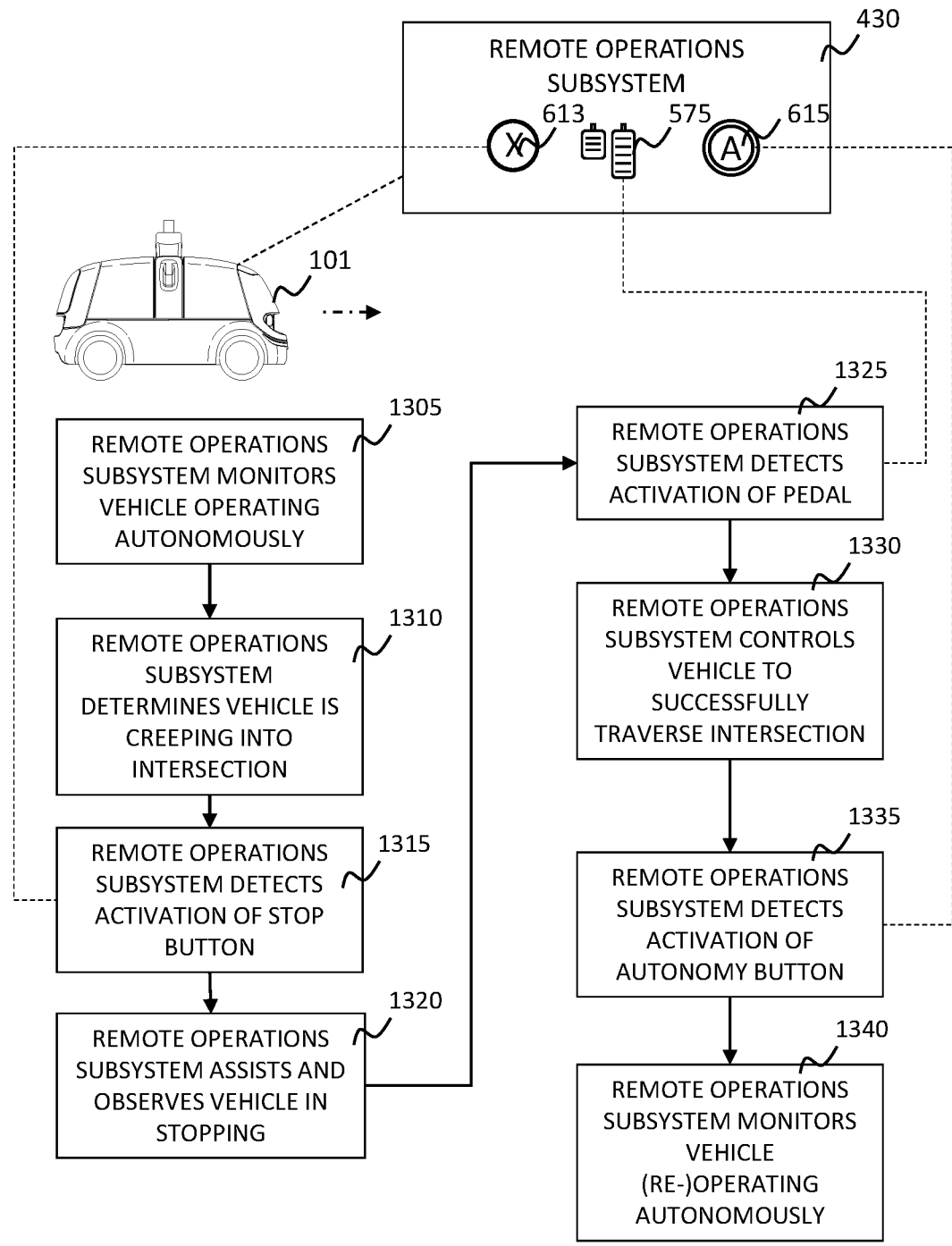
FIG. 13 is a diagram depicting an operational flow for providing remote assistance to an autonomous vehicle, according to yet another example embodiment.

FIG. 13 is a diagram depicting an operational flow 1300 for providing remote assistance to an autonomous vehicle, according to yet another example embodiment. In step 1305, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1310, the remote operations subsystem 430 determines that the autonomous vehicle is creeping into an intersection without the right of way. For example, the remote operations subsystem 430 may make this determination by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can make this determination and provide information regarding its behavior to the remote operations subsystem 430, e.g., as part of an information stream or as part of a request for help.

In step 1315, the remote operations subsystem 430 detects activation of a "stop" remote assistance button 613. For example, a human operator associated with the remote operations subsystem 430 can press the "stop" remote assistance button 613 in response to the determination in step 1310, e.g., to prevent any further creeping by the autonomous vehicle 101.

In step 1320, the remote operations subsystem 430 assists and observes the autonomous vehicle 101 in stopping. For example, a controller of the remote operations subsystem 430 can cooperate with a remote operations controller of the autonomous vehicle 101 to cause the autonomous vehicle 101 to decelerate to a stop. The remote operations subsystem 430 may observe the autonomous vehicle 101 stopping, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1325, the remote operations subsystem 430 detects activation of one or more of a set of brake and acceleration pedals 575 of the remote operations subsystem 430. For example, the human operator associated with the remote operations subsystem 430 can press one or more of the brake and acceleration pedals 575 in order to seize control of the autonomous vehicle 101 through the intersection.

In step 1330, the remote operations subsystem 430 controls operation of the autonomous vehicle 101 to move the autonomous vehicle 101 through the intersection. For example, the human operator can move the autonomous vehicle 101 using a teleoperations or remote control capability of the remote operations subsystem 430, e.g., by using the brake and acceleration pedals 575 and/or a steering wheel or other components to safely move the autonomous vehicle 101 through the intersection.

In step 1335, the remote operations subsystem 430 detects activation of an "autonomy" remote assistance button 615. For example, the human operator can press the "autonomy" remote assistance button 615 to cease remote assistance (including, in this case, remote control) and change (i.e., return) the autonomous vehicle 101 to an autonomous state. For example, the controller of the remote operations subsystem 430 can cooperate with the remote operations controller of the autonomous vehicle 101 to cause the autonomous vehicle 101 to change to the autonomous state. In step 1340, the remote operations subsystem 430 continues to monitor the autonomous vehicle 101, which is now (re-)operating autonomously.

It should be appreciated that the operations depicted in FIG. 13 are illustrative and additional, less, or different operations could be completed in alternative example embodiments.

Figure 14:
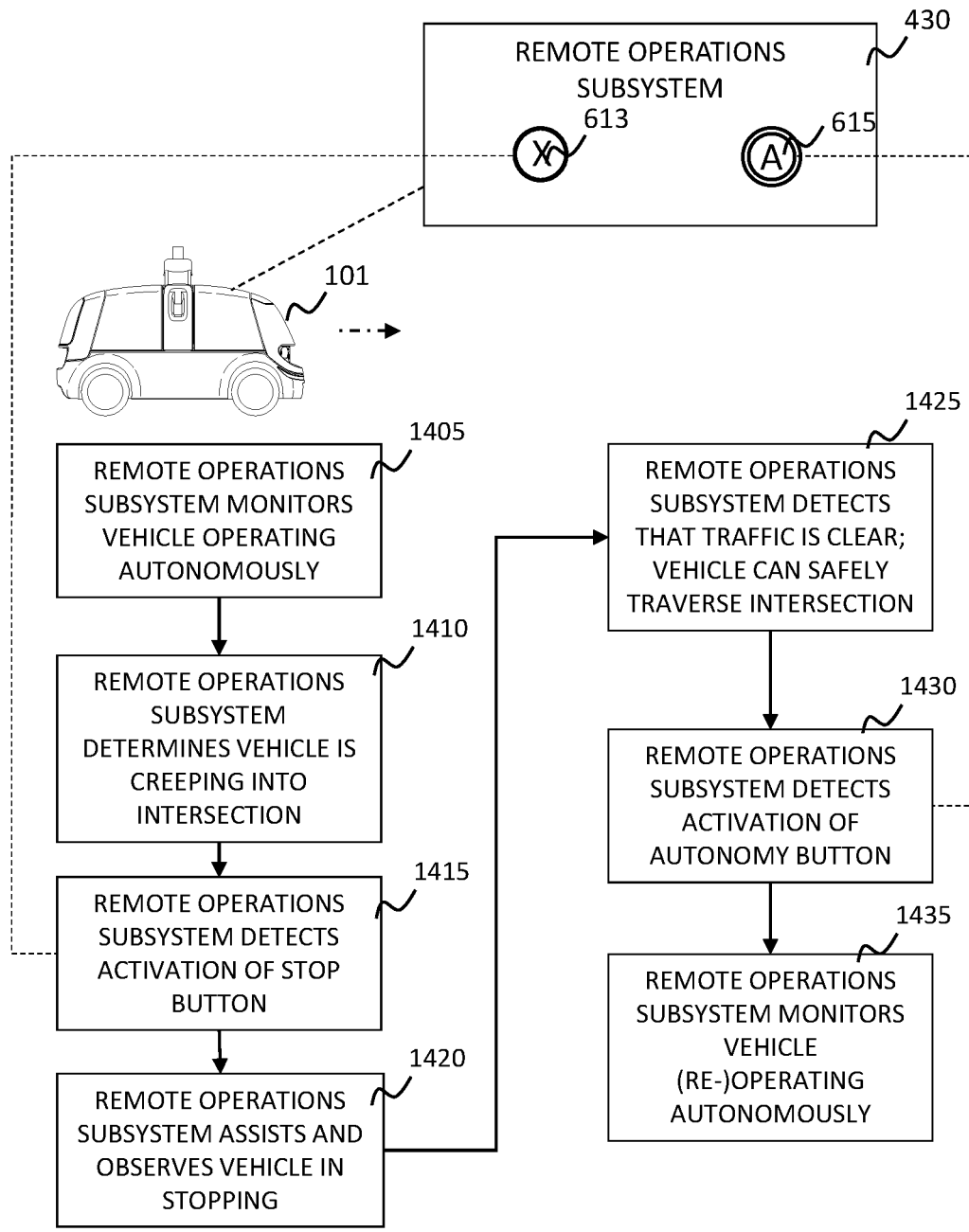
FIG. 14 is a diagram depicting an operational flow for providing remote assistance to an autonomous vehicle, according to yet another example embodiment.

FIG. 14 is a diagram depicting an operational flow 1400 for providing remote assistance to an autonomous vehicle 101, according to yet another example embodiment. In step 1405, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1410, the remote operations subsystem 430 determines that the autonomous vehicle is creeping into an intersection without the right of way. For example, the remote operations subsystem 430 may make this determination by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can make this determination and provide information regarding its behavior to the remote operations subsystem 430, e.g., as part of an information stream or as part of a request for help.

In step 1415, the remote operations subsystem 430 detects activation of a "stop" remote assistance button 613. For example, a human operator associated with the remote operations subsystem 430 can press the "stop" remote assistance button 613 in response to the determination in step 1410, e.g., to prevent any further creeping by the autonomous vehicle 101.

In step 1420, the remote operations subsystem 430 assists and observes the autonomous vehicle 101 in stopping. For example, a controller of the remote operations subsystem 430 can cooperate with a remote operations controller of the autonomous vehicle 101 to cause the autonomous vehicle 101 to decelerate to a stop. The remote operations subsystem 430 may observe the autonomous vehicle 101 stopping, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1425, the remote operations subsystem 430 determines that traffic is clear and that the autonomous vehicle 101 can safely traverse the intersection autonomously. For example, the remote operations subsystem 430 may make this determination by reading, automatically or via input from a human operator, sensor information (e.g., sound and/or images) from the autonomous vehicle 101. Alternatively, the autonomous vehicle 101 can make this determination and provide information regarding the determination to the remote operations sub system 430.

In step 1430, the remote operations subsystem 430 detects activation of an "autonomy" remote assistance button 615. For example, the human operator can press the "autonomy" remote assistance button 615 to cease remote assistance (including, in this case, remote control) and change (i.e., return) the autonomous vehicle 101 to an autonomous state. For example, the controller of the remote operations subsystem 430 can cooperate with the remote operations controller of the autonomous vehicle 101 to cause the autonomous vehicle 101 to change to the autonomous state. In step 1435, the remote operations subsystem 430 continues to monitor the autonomous vehicle 101, which is now (re-) operating autonomously.

It should be appreciated that the operations depicted in FIG. 14 are illustrative and additional, less, or different operations could be completed in alternative example embodiments.

Figure 15:
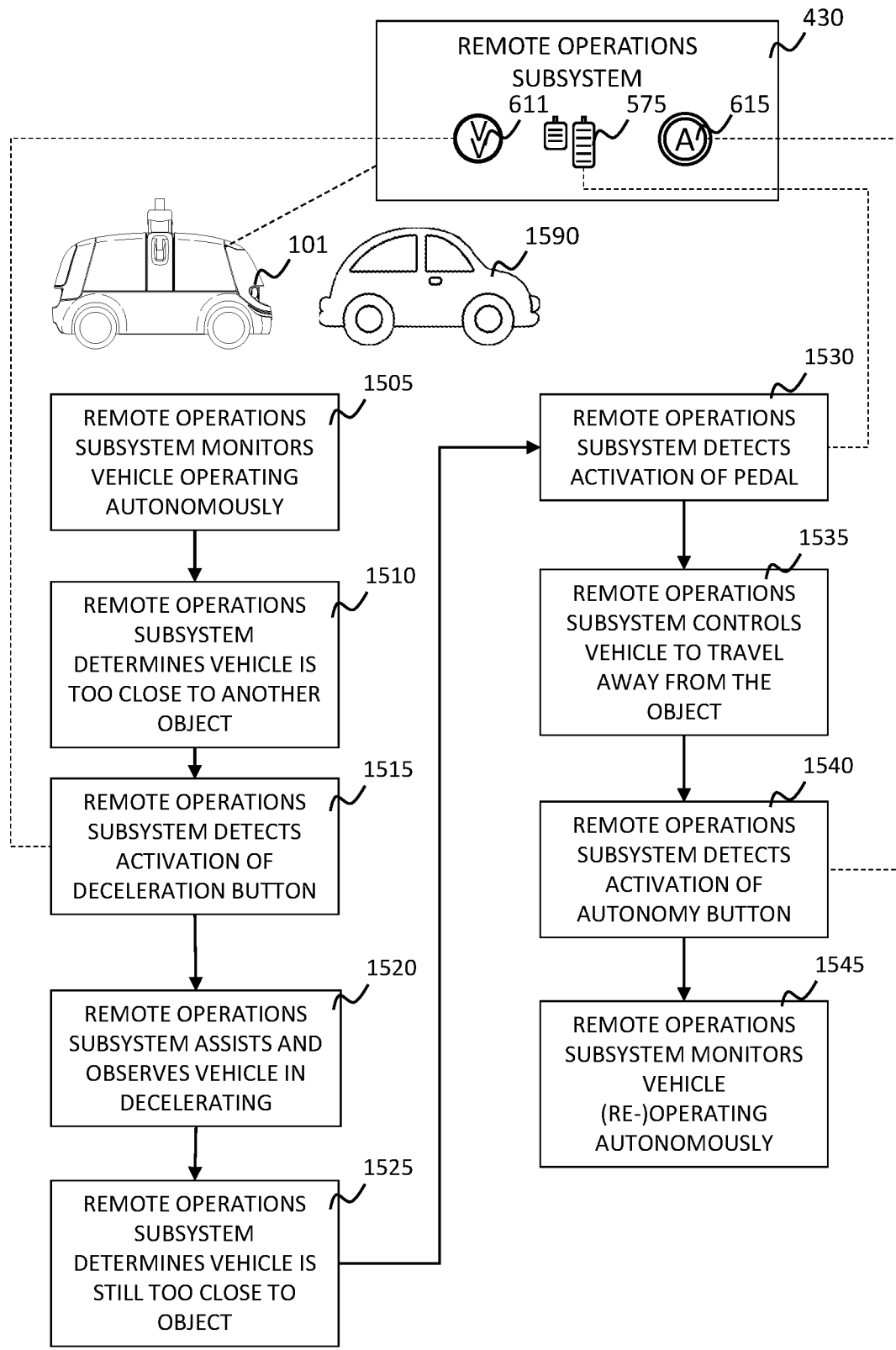
FIG. 15 is a diagram depicting an operational flow for providing remote assistance to an autonomous vehicle, according to yet another example embodiment.

FIG. 15 is a diagram depicting an operational flow 1500 for providing remote assistance to an autonomous vehicle 101, according to yet another example embodiment. In step 1505, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1510, the remote operations subsystem 430 determines that the autonomous vehicle 101 is traveling too close to another object 1590, e.g., another vehicle. For example, the remote operations subsystem 430 may make this determination by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can detect the object 1590 and provide information regarding the object 1590 and/or its behavior to the remote operations subsystem 430, e.g., as part of an information stream or as part of a request for help.

In step 1515, the remote operations subsystem 430 detects activation of a "deceleration" remote assistance button 611. For example, a human operator associated with the remote operations subsystem 430 can press the "deceleration" remote assistance button 611 in response to the determination in step 1510.

In step 1520, the remote operations subsystem 430 assists and observes the autonomous vehicle 101 in decelerating. For example, a controller of the remote operations subsystem 430 can cooperate with a remote operations controller of the autonomous vehicle 101 to cause the autonomous vehicle 101 to autonomously decelerate to a predefined speed (e.g., a slow or moderate speed, such as 15 mph or 20 mph, though the predefined speed could be any speed). For example, the controller may provide the predefined speed to the autonomous vehicle 101 or the autonomous vehicle 101 may determine the predefined speed itself. The remote operations subsystem 430 may observe the autonomous vehicle 101 decelerating, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1525, the remote operations subsystem 430 determines that the autonomous vehicle 101 is still too close to the object 1590. For example, the remote operations subsystem 430 may make this determination by reading and/or processing, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can make this determination and provide information regarding the object 1590 and/or its behavior to the remote operations subsystem 430, e.g., as part of an information stream or as part of a request for help.

In step 1530, the remote operations subsystem 430 detects activation of one or more of a set of brake and acceleration pedals 575 of the remote operations subsystem 430. For example, the human operator associated with the remote operations subsystem 430 can press one or more of the brake and acceleration pedals 575 in response to the determination in step 1525.

In step 1535, the remote operations subsystem 430 controls operation of the autonomous vehicle 101 to move the autonomous vehicle 101 away from the object 1590. For example, the human operator can move the autonomous vehicle 101 using a teleoperations or remote control capability of the remote operations subsystem 430, e.g., by using the brake and acceleration pedals 575 and/or a steering wheel or other components to navigate the autonomous vehicle 101 away from the object 1590.

In step 1540, the remote operations subsystem 430 detects activation of an "autonomy" remote assistance button 615. For example, the human operator can press the "autonomy" remote assistance button 615 to cease remote assistance (including, in this case, remote control) and change (i.e., return) the autonomous vehicle 101 to an autonomous state. For example, the controller of the remote operations subsystem 430 can cooperate with the remote operations controller of the autonomous vehicle 101 to cause the autonomous vehicle 101 to change to the autonomous state. In step 1545, the remote operations subsystem 430 continues to monitor the autonomous vehicle 101, which is now (re-) operating autonomously.

It should be appreciated that the operations depicted in FIG. 15 are illustrative and additional, less, or different operations could be completed in alternative example embodiments.

Figure 16:
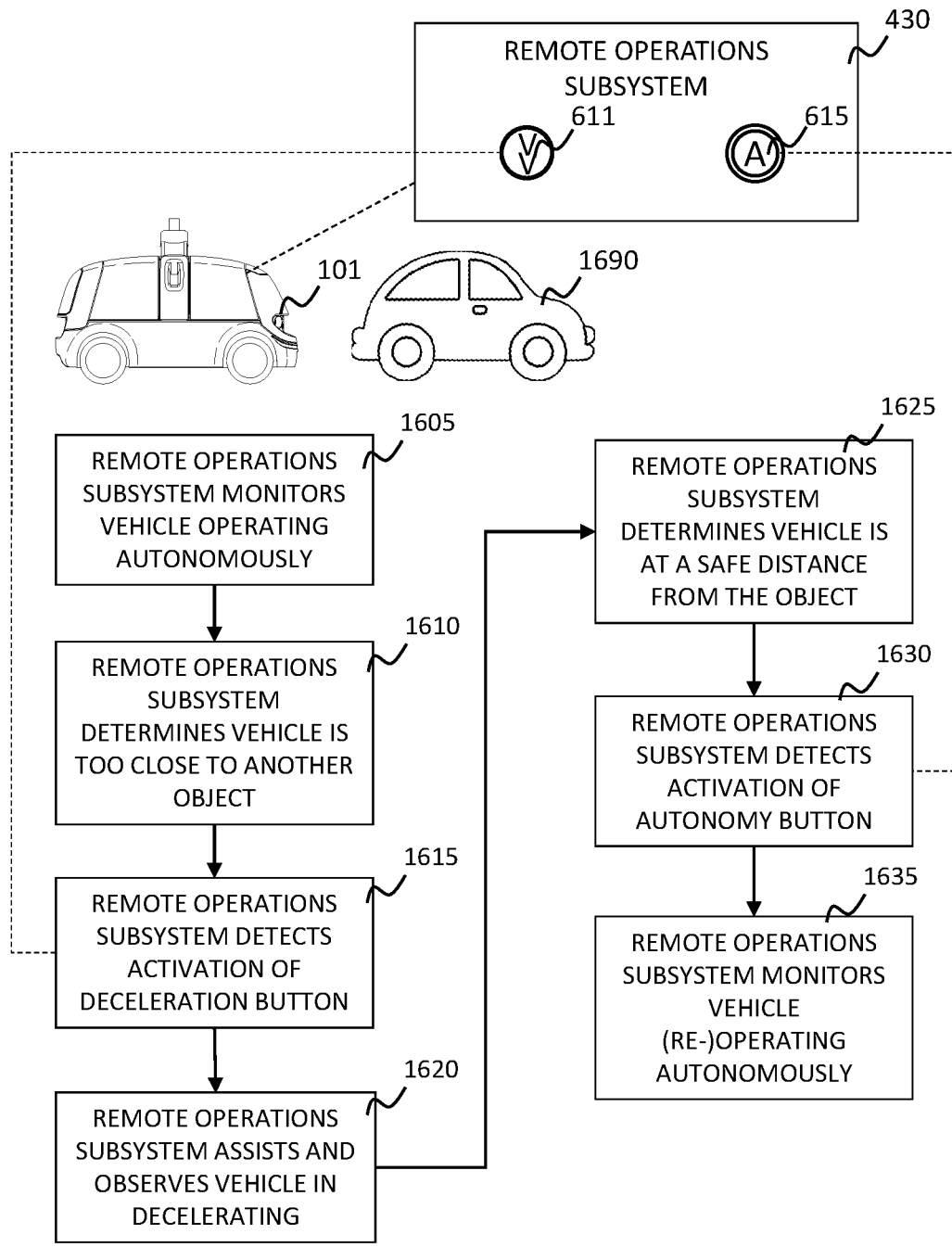
FIG. 16 is a diagram depicting an operational flow for providing remote assistance to an autonomous vehicle, according to yet another example embodiment.

FIG. 16 is a diagram depicting an operational flow 1600 for providing remote assistance to an autonomous vehicle 101, according to yet another example embodiment. In step 1605, a remote operations subsystem 430 monitors an autonomous vehicle 101 operating autonomously. For example, the autonomous vehicle 101 may be turned on and sitting idle, traveling from a first location to a second location, or taking another action. The remote operations subsystem 430 may monitor the autonomous vehicle 101, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1610, the remote operations subsystem 430 determines that the autonomous vehicle 101 is traveling too close to another object 1590, e.g., another vehicle. For example, the remote operations subsystem 430 may make this determination by reading, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can detect the object 1690 and provide information regarding the object 1690 and/or its behavior to the remote operations subsystem 430, e.g., as part of an information stream or as part of a request for help.

In step 1615, the remote operations subsystem 430 detects activation of a "deceleration" remote assistance button 611. For example, a human operator associated with the remote operations subsystem 430 can press the "deceleration" remote assistance button 611 in response to the determination in step 1610.

In step 1620, the remote operations subsystem 430 assists and observes the autonomous vehicle 101 in decelerating. For example, a controller of the remote operations subsystem 430 can cooperate with a remote operations controller of the autonomous vehicle 101 to cause the autonomous vehicle 101 to autonomously decelerate to a predefined speed (e.g., a slow or moderate speed, such as 15 mph or 20 mph, though the predefined speed could be any speed). For example, the controller may provide the predefined speed to the autonomous vehicle 101 or the autonomous vehicle 101 may determine the predefined speed itself. The remote operations subsystem 430 may observe the autonomous vehicle 101 decelerating, e.g., using information provided by, or collected from, the autonomous vehicle 101 and/or one or more other subsystems of a fleet management system or another object or system external to the autonomous vehicle (such as another autonomous vehicle in a fleet to which the autonomous vehicle 101 belongs).

In step 1625, the remote operations subsystem 430 determines that the autonomous vehicle 101 is at a safe distance from the object 1690. For example, the remote operations subsystem 430 may make this determination by reading and/or processing, automatically or via input from a human operator, sensor information (e.g., sound and/or images) from the autonomous vehicle 101 or using information provided by, or collected from, one or more other subsystems of a fleet management system or another object or system external to the autonomous vehicle (such as another autonomous vehicle in a fleet to which the autonomous vehicle 101 belongs). Alternatively, the autonomous vehicle 101 can make this determination and provide information regarding the object 1690 and/or its behavior to the remote operations subsystem 430.

In step 1630, the remote operations subsystem 430 detects activation of an "autonomy" remote assistance button 615. For example, the human operator can press the "autonomy" remote assistance button 615 to cease remote assistance (including, in this case, remote control) and change (i.e., return) the autonomous vehicle 101 to an autonomous state. For example, the controller of the remote operations subsystem 430 can cooperate with the remote operations controller of the autonomous vehicle 101 to cause the autonomous vehicle 101 to change to the autonomous state. In step 1635, the remote operations subsystem 430 continues to monitor the autonomous vehicle 101, which is now (re-)operating autonomously.

It should be appreciated that the operations depicted in FIG. 16 are illustrative and additional, less, or different operations could be completed in alternative example embodiments.

Figure 17:
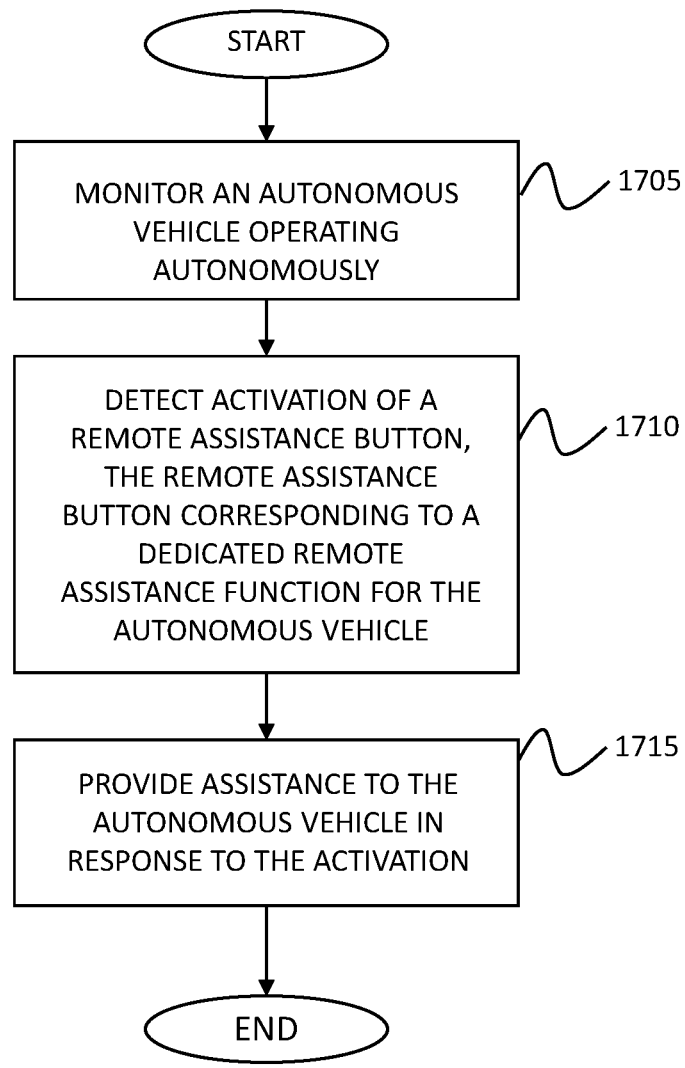
FIG. 17 is a flow chart of a method for providing remote assistance to an autonomous vehicle, according to an example embodiment.

FIG. 17 is a flow chart of a method 1700 for providing remote assistance to an autonomous vehicle, according to an example embodiment. In step 1705, a remote operations subsystem monitors an autonomous vehicle operating autonomously. For example, the autonomous vehicle may be turned on and sitting idle, traveling from a first location to a second location, or taking another action. The remote operations subsystem may monitor the autonomous vehicle, e.g., using information provided by, or collected from, the autonomous vehicle and/or one or more other subsystems of a fleet management system or another object or system external to the autonomous vehicle (such as another autonomous vehicle in a fleet to which the autonomous vehicle belongs).

In step 1710, the remote operations subsystem detects activation of a remote assistance button. The remote assistance button corresponds to a dedicated remote assistance function for the autonomous vehicle. For example, the remote assistance function can include provision of supervision/input to the autonomous vehicle or seizure of control of the autonomous vehicle by the remote operations subsystem. The remote assistance button, e.g., can include a physical electromechanical device, which can be selectively activated, to cause the autonomous vehicle to stop, decelerate, or pull over.

In step 1715, the remote operations subsystem provides assistance to the autonomous vehicle in response to the activation of the remote assistance button. For example, the remote operations subsystem can provide information and/or supervision to assist the autonomous vehicle in completing the function associated with the activated remote assistance button. The assistance can be provided with or without the remote operations subsystem taking over control of the autonomous vehicle.

As would be recognized by a person of skill in the art, the steps associated with the operational flows and methods of the present disclosure, including the operational flows and methods presented in FIGS. 7-17, may vary widely. Steps may be added, removed, altered, combined, and reordered without departing from the spirit or the scope of the present disclosure. Therefore, the example operational flows and methods are to be considered illustrative and not restrictive, and the examples are not to be limited to the details given herein but may be modified within the scope of the appended claims.

Figure 18:
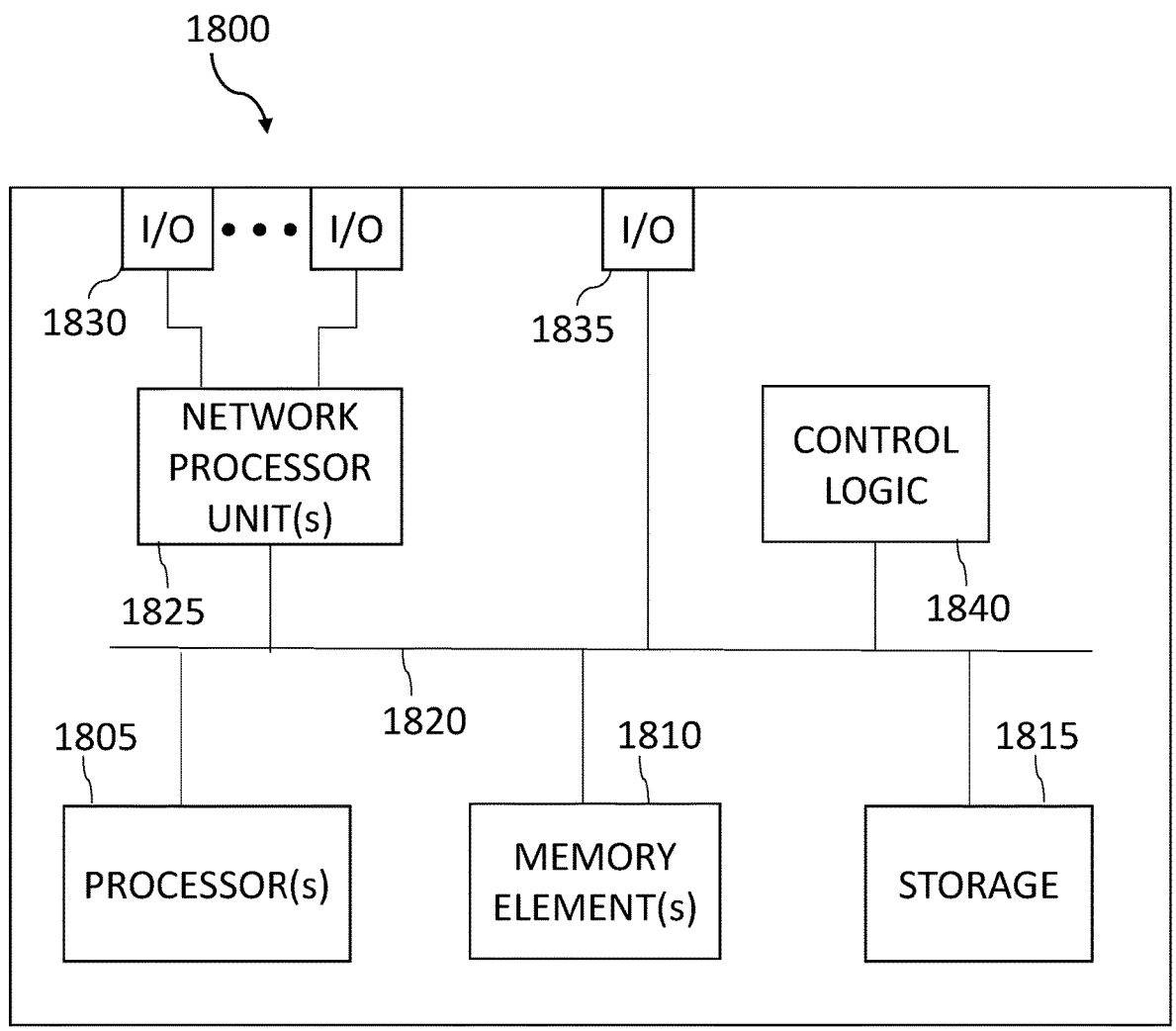
FIG. 18 is a block diagram of a computing device configured to perform operations for providing remote assistance to an autonomous vehicle, according to an example embodiment.

Referring now to FIG. 18, FIG. 18 illustrates a hardware block diagram of a computing device 1800 that may perform functions associated with operations discussed herein in connection with the techniques depicted in FIGS. 1-17. In various example embodiments, a computing device, such as computing device 1800 or any combination of computing devices 1800, may be configured as any entity/entities as discussed for the techniques depicted in connection with FIGS. 1-17, such as the remote operations controller 350, the remote operations subsystem 430, vehicle control system 490, vehicle assistance system 495, computing device 550, communications module 557, and/or controller 555, in order to perform operations of the various techniques discussed herein.

In at least one embodiment, computing device 1800 may include one or more processor(s) 1805, one or more memory element(s) 1810, storage 1815, a bus 1820, one or more network processor unit(s) 1825 interconnected with one or more network input/output (I/O) interface(s) 1830, one or more I/O interface(s) 1835, and control logic 1840. In various embodiments, instructions associated with logic for computing device 1800 can overlap in any manner and are not limited to the specific allocation of instructions and/or operations described herein.

In at least one embodiment, processor(s) 1805 is/are at least one hardware processor configured to execute various tasks, operations and/or functions for computing device 1800 as described herein according to software and/or instructions configured for computing device. Processor(s) 1805 (e.g., a hardware processor) can execute any type of instructions associated with data to achieve the operations detailed herein. In one example, processor(s) 1805 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1810 and/or storage 1815 is/are configured to store data, information, software, and/or instructions associated with computing device 1800, and/or logic configured for memory element(s) 1810 and/or storage 1815. For example, any logic described herein (e.g., control logic 1840) can, in various embodiments, be stored for computing device 1800 using any combination of memory element(s) 1810 and/or storage 1815. Note that in some embodiments, storage 1815 can be consolidated with memory element(s) 1810 (or vice versa), or can overlap/exist in any other suitable manner.

In at least one embodiment, bus 1820 can be configured as an interface that enables one or more elements of computing device 1800 to communicate in order to exchange information and/or data. Bus 1820 can be implemented with any architecture designed for passing control, data and/or information between processors, memory elements/storage, peripheral devices, and/or any other hardware and/or software components that may be configured for computing device 1800. In at least one embodiment, bus 1820 may be implemented as a fast kernel-hosted interconnect, potentially using shared memory between processes (e.g., logic), which can enable efficient communication paths between the processes.

In various embodiments, network processor unit(s) 1825 may enable communication between computing device 1800 and other systems, entities, etc., via network I/O interface(s) 1830 to facilitate operations discussed for various embodiments described herein. In various embodiments, network processor unit(s) 1825 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1800 and other systems, entities, etc. to facilitate operations for various embodiments described herein. In various embodiments, network I/O interface(s) 1830 can be configured as one or more Ethernet port(s), Fibre Channel ports, and/or any other I/O port(s) now known or hereafter developed. Thus, the network processor unit(s) 1825 and/or network I/O interfaces 1830 may include suitable interfaces for receiving, transmitting, and/or otherwise communicating data and/or information in a network environment.

I/O interface(s) 1835 allow for input and output of data and/or information with other entities that may be connected to computer device 1800. For example, I/O interface(s) 1835 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1840 can include instructions that, when executed, cause processor(s) 1805 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1840) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1810 and/or storage 1815 can store data, software, code, instructions (e.g., processor instructions), logic, parameters, combinations thereof, and/or the like used for operations described herein. This includes memory element(s) 1810 and/or storage 1815 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method can include monitoring, by a remote operations system, an autonomous vehicle operating autonomously, the remote operations system located remote from the autonomous vehicle. The remote operations system can detect activation of a remote assistance button by an operator of the remote operations system. The remote assistance button can correspond to a dedicated remote assistance function for the autonomous vehicle. The remote operations system can provide assistance to the autonomous vehicle in response to the activation. For example, the remote operations system can provide the assistance by providing input assistance into operation of the autonomous vehicle without take over control of the autonomous vehicle. The remote assistance button can include, e.g., a physical electromechanical device.

For example, the detecting can include detecting activation of a stop remote assistance button, and the providing can include sending instructions to the autonomous vehicle, causing the autonomous vehicle to, autonomously, decelerate to a stop. Alternatively, the detecting can include detecting activation of an emergency stop remote assistance button, and the providing can include sending instructions to the autonomous vehicle, causing the autonomous vehicle to decelerate to a substantially immediate stop; or the detecting can include detecting activation of a pull over remote assistance button, and the providing can include sending instructions to the autonomous vehicle, causing the autonomous vehicle to, autonomously, move to a safe location and decelerate to a stop; or the detecting can include detecting activation of a deceleration remote assistance button, and the providing can include sending instructions to the autonomous vehicle, causing the autonomous vehicle to, autonomously, decelerate to a predefined speed. In an example embodiment, the detecting can include detecting activation of one of a plurality of remote assistance buttons, each of the plurality of remote assistance buttons corresponding to a different, dedicated remote assistance function for the autonomous vehicle.

In an example embodiment, the method can further include determining, by the remote operations system, whether an autonomous operation button has been activated, the autonomous operation button being configured to be selectively activated to cease remote assistance for the autonomous vehicle; and causing, by the remote operations system, the autonomous vehicle to operate autonomously in response to determining that the autonomous operation button has been activated. In addition, the method can further include determining, by the remote operations system, whether a teleoperations input has been activated, the teleoperations input being configured to be selectively activated to initiate teleoperations assistance for the autonomous vehicle; and causing, by the remote operations system, the autonomous vehicle to operate via teleoperations in response to determining that the teleoperations input has been activated.

In another form, a system includes at least one remote assistance button configured to be selectively activated to initiate remote assistance for an autonomous vehicle, the at least one remote assistance button corresponding to a dedicated remote assistance function for the autonomous vehicle. The system further includes a controller that is configured to detect activation of the at least one remote assistance button, and cause remote assistance to be provided to the autonomous vehicle in response to the activation. For example, the controller and the at least one remote assistance button can be located remote from the autonomous vehicle.

In another form, a system can include a remote assistance button configured to be selectively activated to initiate remote assistance for an autonomous vehicle, the remote assistance button corresponding to a dedicated remote assistance function for the autonomous vehicle; an autonomous operation button configured to be selectively activated to cease remote assistance for the autonomous vehicle; and a teleoperations input configured to be selectively activated to initiate teleoperations assistance for the autonomous vehicle. The system can further include a controller configured to detect activation of the remote assistance button; cause remote assistance to be provided to the autonomous vehicle in response to activation of the remote assistance button; detect activation of the autonomous operation button; cause the autonomous vehicle to operate autonomously in response to activation of the autonomous operation button; detect activation of the teleoperations input; and cause the autonomous vehicle to operate via teleoperations in response to activation of the teleoperations input.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
monitoring, by a remote operations system, an autonomous vehicle operating autonomously, the remote operations system located remote from the autonomous vehicle;
detecting, by the remote operations system, activation of a remote assistance button by an operator of the remote operations system, the remote assistance button corresponding to a dedicated remote assistance function for the autonomous vehicle; and
providing, by the remote operations system, assistance to the autonomous vehicle in response to the activation without directly taking over control of the autonomous vehicle.

2. The computer-implemented method of claim 1, wherein detecting comprises detecting activation of a stop remote assistance button, and providing comprises sending instructions to the autonomous vehicle, causing the autonomous vehicle to, autonomously, decelerate to a stop.

3. The computer-implemented method of claim 1, wherein detecting comprises detecting activation of an emergency stop remote assistance button, and providing comprises sending instructions to the autonomous vehicle, causing the autonomous vehicle to decelerate to a substantially immediate stop.

4. The computer-implemented method of claim 1, wherein detecting comprises detecting activation of a pull over remote assistance button, and providing comprises sending instructions to the autonomous vehicle, causing the autonomous vehicle to, autonomously, move to a safe location and decelerate to a stop.

5. The computer-implemented method of claim 1, wherein detecting comprises detecting activation of a deceleration remote assistance button, and providing comprises sending instructions to the autonomous vehicle, causing the autonomous vehicle to, autonomously, decelerate to a predefined speed.

6. The computer-implemented method of claim 1, wherein detecting comprises detecting activation of one of a plurality of remote assistance buttons, each of the plurality of remote assistance buttons corresponding to a different, dedicated remote assistance function for the autonomous vehicle.

7. The computer-implemented method of claim 1, wherein providing comprises providing input assistance into an autonomous operation of the autonomous vehicle without take over the control of the autonomous vehicle by the remote operations system.

8. The computer-implemented method of claim 1, further comprising:
    determining, by the remote operations system, whether an autonomous operation button has been activated, the autonomous operation button being configured to be selectively activated to cease remote assistance for the autonomous vehicle; and
    causing, by the remote operations system, the autonomous vehicle to operate autonomously in response to determining that the autonomous operation button has been activated.

9. The computer-implemented method of claim 1, further comprising:
    determining, by the remote operations system, whether a teleoperations input has been activated, the teleoperations input being configured to be selectively activated to initiate teleoperations assistance for the autonomous vehicle; and
    causing, by the remote operations system, the autonomous vehicle to operate via teleoperations in response to determining that the teleoperations input has been activated.

10. The computer-implemented method of claim 1, wherein the remote assistance button comprises a physical electromechanical device.

11. A system comprising:
    at least one remote assistance button configured to be selectively activated to initiate remote assistance for an autonomous vehicle, the at least one remote assistance button corresponding to a dedicated remote assistance function for the autonomous vehicle; and
    a controller configured to:
        detect activation of the at least one remote assistance button, and
        cause remote assistance to be provided to the autonomous vehicle in response to the activation without directly taking over control of the autonomous vehicle,
    wherein the controller and the at least one remote assistance button are located remote from the autonomous vehicle.

12. The system of claim 11, wherein the at least one remote assistance button comprises a stop remote assistance button, and wherein the controller is configured to cause the autonomous vehicle to, autonomously, decelerate to a stop in response to activation of the stop remote assistance button.

13. The system of claim 11, wherein the at least one remote assistance button comprises an emergency stop remote assistance button, and wherein the controller is configured to cause the autonomous vehicle to decelerate to a substantially immediate stop in response to activation of the emergency stop remote assistance button.

14. The system of claim 11, wherein the at least one remote assistance button comprises a pull over remote assistance button, and wherein the controller is configured to cause the autonomous vehicle to, autonomously, move to a safe location and decelerate to a stop in response to activation of the pull over remote assistance button.

15. The system of claim 11, wherein the at least one remote assistance button comprises a deceleration remote assistance button, and wherein the controller is configured to cause the autonomous vehicle to, autonomously, decelerate to a predefined speed in response to activation of the deceleration remote assistance button.

16. The system of claim 11, wherein the at least one remote assistance button comprises a plurality of remote assistance buttons, each of the plurality of remote assistance buttons corresponding to a different, dedicated remote assistance function for the autonomous vehicle.

17. The system of claim 11, wherein the controller is configured to cause remote assistance to be provided to the autonomous vehicle in response to the activation by providing input assistance into an autonomous operation of the autonomous vehicle without taking over control of the autonomous vehicle by the controller.

18. The system of claim 11, further comprising at least one autonomous operation button configured to be selectively activated to cease remote assistance for the autonomous vehicle, the controller being further configured to cause the autonomous vehicle to operate autonomously in response to activation of one or more of the at least one autonomous operation button.

19. The system of claim 11, further comprising at least one teleoperations input configured to be selectively activated to initiate teleoperations assistance for the autonomous vehicle, the controller being further configured to cause the autonomous vehicle to operate via teleoperations in response to activation of one or more of the at least one teleoperations input.

20. The system of claim 11, wherein each of the at least one remote assistance button comprises a physical electromechanical device.

21. A system comprising:
    a remote assistance button configured to be selectively activated to initiate remote assistance for an autonomous vehicle without directly taking over control of the autonomous vehicle, the remote assistance button corresponding to a dedicated remote assistance function for the autonomous vehicle;
    an autonomous operation button configured to be selectively activated to cease remote assistance for the autonomous vehicle;
    a teleoperations input configured to be selectively activated to initiate teleoperations assistance for the autonomous vehicle; and
    a controller configured to:
        detect activation of the remote assistance button,
        cause remote assistance to be provided to the autonomous vehicle in response to activation of the remote assistance button without directly taking over the control of the autonomous vehicle, detect activation of the autonomous operation button,
cause the autonomous vehicle to operate autonomously in response to activation of the autonomous operation button,
detect activation of the teleoperations input, and
cause the autonomous vehicle to operate via teleoperations in response to activation of the teleoperations input.

22. The system of claim 21, wherein each of the remote assistance button, the autonomous operation button, and the teleoperations input comprises a physical electromechanical device.

23. The system of claim 21, wherein the remote assistance button comprises a stop remote assistance button, and wherein the controller is configured to cause the autonomous vehicle to, autonomously, decelerate to a stop in response to activation of the stop remote assistance button.

24. The system of claim 21, wherein the remote assistance button comprises an emergency stop remote assistance button, and wherein the controller is configured to cause the autonomous vehicle to decelerate to a substantially immediate stop in response to activation of the emergency stop remote assistance button.

25. The system of claim 21, wherein the remote assistance button comprises a pull over remote assistance button, and wherein the controller is configured to cause the autonomous vehicle to, autonomously, move to a safe location and decelerate to a stop in response to activation of the pull over remote assistance button.

26. The system of claim 21, wherein the remote assistance button comprises a deceleration remote assistance button, and wherein the controller is configured to cause the autonomous vehicle to, autonomously, decelerate to a predefined speed in response to activation of the deceleration remote assistance button.

27. The system of claim 21, wherein the remote assistance button is one of a plurality of remote assistance buttons, each of the plurality of remote assistance buttons corresponding to a different, dedicated remote assistance function for the autonomous vehicle.

28. The system of claim 21, wherein the controller is configured to cause remote assistance to be provided to the autonomous vehicle in response to activation of the remote assistance button by providing input assistance into an autonomous operation of the autonomous vehicle without taking over the control of the autonomous vehicle by the teleoperations assistance.

* * * * *